US 12,506,558 B2

(12) United States Patent
Brunner et al.

(10) Patent No.: US 12,506,558 B2
(45) Date of Patent: Dec. 23, 2025

(54) PROTECTION OF RADAR SEQUENCING DATA FOR EFFICIENT REAL-TIME PROGRAMMING MODEL

(71) Applicant: Infineon Technologies AG, Neubiberg (DE)

(72) Inventors: Martin Brunner, Linz (AT); Bernhard Greslehner-Nimmervoll, Hagenberg (AT); Daniel Maier, Schenkenfelden (AT); Thomas Fritz, Groß St. Florian (AT); Rainer Findenig, Linz (AT); Maximilian Vogl, Aschach an der Steyr (AT)

(73) Assignee: Infineon Technologies AG, Neubiberg (DE)

( * ) Notice: Subject to any disclaimer, the term of this patent is extended or adjusted under 35 U.S.C. 154(b) by 58 days.

(21) Appl. No.: 18/655,666

(22) Filed: May 6, 2024

(65) Prior Publication Data
US 2025/0343628 A1    Nov. 6, 2025

(51) Int. Cl.
*H04L 1/00* (2006.01)
(52) U.S. Cl.
CPC .... *H04L 1/0061* (2013.01); *H04L 2001/0098* (2013.01)

(58) Field of Classification Search
CPC ... H04L 1/0061; H04L 1/0063; G01S 13/342; G01S 13/347
See application file for complete search history.

(56) References Cited

U.S. PATENT DOCUMENTS

| | | | |
|---|---|---|---|
| 2020/0025870 A1* | 1/2020 | Melzer | G01S 7/032 |
| 2020/0244398 A1* | 7/2020 | Anastasov | G01S 13/584 |

* cited by examiner

*Primary Examiner* — Shelly A Chase
(74) *Attorney, Agent, or Firm* — Harrity & Harrity, LLP

(57) ABSTRACT

A monolithic microwave integrated circuit (MMIC) semiconductor chip includes a millimeter-wave signal generator configured to generate a signal comprising a plurality of signal sequences; a central sequencer configured to control at least one decentral sequence generator based on a timestamp information and a configuration instance transmitted in a transmission from the central sequencer to the decentral sequence generator to control at least one corresponding component in a cycle-accurate manner; a first error detection mechanism corresponding to the transmission from the central sequencer to the at least one decentral sequence generator; and a second error detection mechanism that is independent of the first error detection mechanism, the second error detection mechanism corresponding to an execution by the decentral sequence generator to control the at least one corresponding component based on the timestamp information and the configuration instance transmitted in the transmission.

25 Claims, 11 Drawing Sheets

PROTECTION OF RADAR SEQUENCING DATA FOR EFFICIENT REAL-TIME PROGRAMMING MODEL

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as, for example, in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a radar semiconductor chip includes a ramp signal generator configured to generate a frequency-modulated ramp signal comprising a plurality of frequency ramps of a ramp scenario; a memory configured to store a sequencing program associated with controlling one or more components of the radar semiconductor chip in a time-dependent manner; a main sequencer configured to: read the sequencing program from the memory, derive, from the sequencing program, a plurality of instances of configuration data and a corresponding timestamp for each instance of configuration data, generate a plurality of telegrams, wherein each telegram of the plurality of telegrams includes at least one instance of configuration data, at least one timestamp associated with the at least one instance of configuration data, and a first error-detecting code associated with the telegram, and transmit the plurality of telegrams; and at least one sequence generator configured to receive the plurality of telegrams from the main sequencer, generate a second error-detecting code for each telegram, compare the first error-detecting code and the second error-detecting code associated with a same telegram, and trigger a first alarm based on a mismatch between the first error-detecting code and the second error-detecting code.

In some implementations, a radar semiconductor chip includes a ramp signal generator configured to generate a frequency-modulated ramp signal comprising a plurality of frequency ramps of a ramp scenario; and a sequence generator configured to: receive a plurality of telegrams that provides a plurality of instances of configuration data and corresponding timestamps, wherein each telegram includes an instance of configuration data and a corresponding timestamp associated with the instance of configuration data, generate a plurality of first corresponding error-detecting codes from the plurality of telegrams, including a first corresponding error-detecting code for each instance of configuration data, store the plurality of instances of configuration data and the corresponding timestamps in a first in, first out (FIFO) buffer according to a FIFO sequence, generate a plurality of second corresponding error-detecting codes, including a second corresponding error-detecting code for each instance of configuration data read out from the FIFO buffer, compare, based on the FIFO sequence, the first corresponding error-detecting code and the second corresponding error-detecting code associated with a same instance of configuration data, and trigger a first alarm based on a mismatch between the first corresponding error-detecting code and the second corresponding error-detecting code.

In some implementations, a monolithic microwave integrated circuit (MMIC) semiconductor chip includes a millimeter-wave signal generator configured to generate a signal comprising a plurality of signal sequences; a central sequencer configured to control at least one decentral sequence generator based on a timestamp information and a configuration instance transmitted in a transmission from the central sequencer to the decentral sequence generator to control at least one corresponding component in a cycle-accurate manner; a first error detection mechanism corresponding to the transmission from the central sequencer to the at least one decentral sequence generator; and a second error detection mechanism that is independent of the first error detection mechanism, the second error detection mechanism corresponding to an execution by the decentral sequence generator to control the at least one corresponding component based on the timestamp information and the configuration instance transmitted in the transmission.

BRIEF DESCRIPTION OF THE DRAWINGS

Implementations are described herein making reference to the appended drawings.

DETAILED DESCRIPTION

Figure 1:
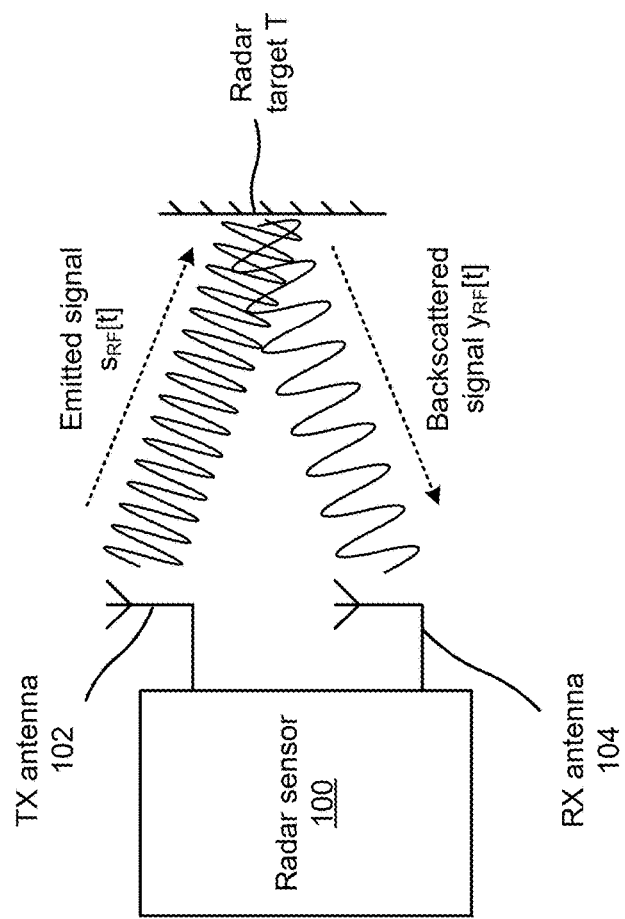
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar monolithic microwave integrated circuit (MMIC), sometimes referred to as a single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or baseband signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc., are used. In radar applications, phased antenna arrays may be employed to sense an incidence angle of incoming RF radar signals (also referred to as "direction of arrival" or DOA).

A microcontroller may act as a supervisor for a radar MMIC by sending commands and receiving responses over one or more communication channels (e.g., a bus system, such as a serial peripheral interface (SPI)). As a result, the radar MMIC may be controlled by the microcontroller.

Frequency-modulated continuous-wave (FMCW) radar applications rely on transmitting multiple frequency sweeps in a time-controlled manner. For example, the radar MMIC may include a ramp signal generator that is configured to generate a frequency-modulated ramp signal (e.g., an FMCW ramp signal) that includes a plurality of frequency ramps of a ramp scenario. In addition to generating the frequency-modulated ramp signal, the radar MMIC may be responsible for performing several on-chip functions, such as temperature monitoring, power or phase monitoring, receiver gain monitoring, decimation rate reconfiguration, and/or interference mitigation actions. The on-chip functions should be performed synchronously with a transmission of the frequency ramps or should be performed between different frequency ramp sequences of the ramp scenario. In some cases, the on-chip functions should be performed without disrupting timing relationships between individual frequency ramps and/or between the different frequency ramp sequences of the ramp scenario.

FMCW radar systems are becoming more prevalent in vehicles in order to enable ADAS, as well as autonomous driving features. As a result, ensuring normal operation of a FMCW radar system is important to ensure safer operation of a vehicle. Thus, each parameter used in the FMCW radar system should be protected against random hardware faults in order to ensure correct and safe operation of the FMCW radar system.

Some implementations disclosed herein are directed to a radar MMIC that includes one or more protection mechanisms for protecting one or more aspects of the radar MMIC by detecting one or more faults. For example, a protection mechanism may protect the radar MMIC from random hardware faults by detecting and indication a presence of a random hardware fault. For example, a protection mechanism may evaluate a data distribution between sequencer components of a sequencing circuit for detecting one or more faults. Additionally, or alternatively, a protection mechanism may evaluate a processing operation performed by one or more sequencer components of the sequencing circuit for detecting one or more faults. Additionally, or alternatively, a protection mechanism may evaluate an operation of a controlled component of the radar MMIC for detecting one or more faults. Each protection mechanism may evaluate one or more aspects of the radar MMIC without disrupting timing relationships between individual frequency ramps and/or between the different frequency ramp sequences of the ramp scenario.

FIG. 1 is a diagram illustrating an example application of an FMCW radar sensor in the form of a radar sensor 100 for measuring distances, velocities, or angles of arrival (AoAs) associated with objects, also referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $s_{RF}(t)$ (also referred to as a transmitted radar signal), which is frequency-modulated, for example, by a periodic linear frequency ramp signal (also referred to as a frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy as compared to a radar sensor that may use a single TX antenna and/or a signal RX antenna.

It will be appreciated that "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
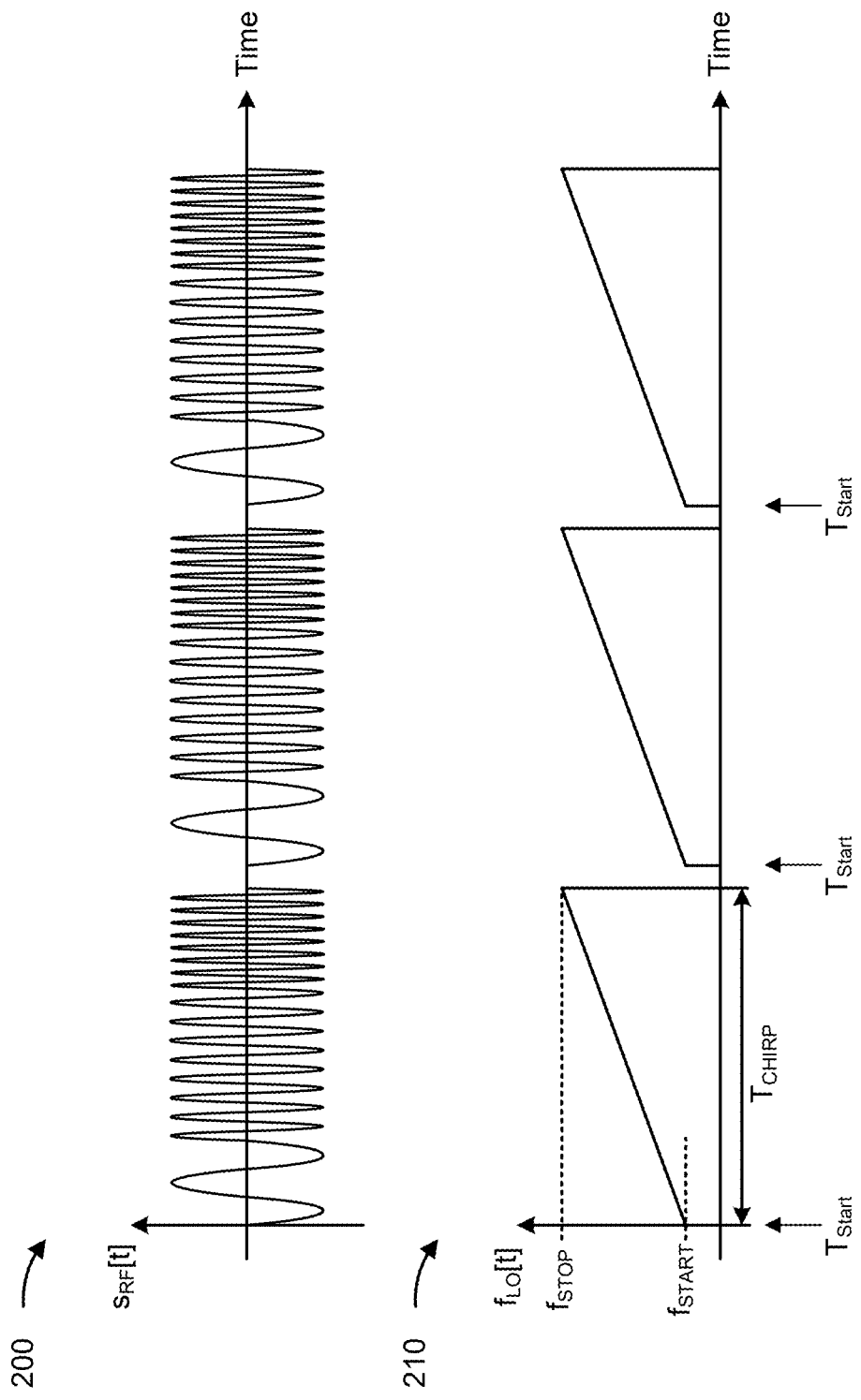
FIG. 2 illustrates an example of frequency modulation of a transmitted radar signal transmitted by the FMCW radar sensor.

FIG. 2 illustrates an example of the frequency modulation of the RF signal $s_{RF}(t)$. As illustrated in the upper diagram 200 of FIG. 2, the RF signal $s_{RF}(t)$ comprises a plurality of frequency ramps or a series of "chirps"; that is to say, the RF signal $s_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, from a start frequency $f_{START}$ to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $s_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency Fmin and maximum frequency Fmax. As a result, the minimum frequency Fmin and the maximum frequency Fmax define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary depending on the actual implementation and/or use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, the start frequency $f_{START}$ and stop frequency $f_{STOP}$ may vary within a radar frame or across multiple radar frames. A local oscillator signal $S_{LO}(t)$ may be used to generate the RF signal $s_{RF}(t)$. Thus, it can be said that the local oscillator signal $S_{LO}(t)$ and the RF signal $s_{RF}(t)$ are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
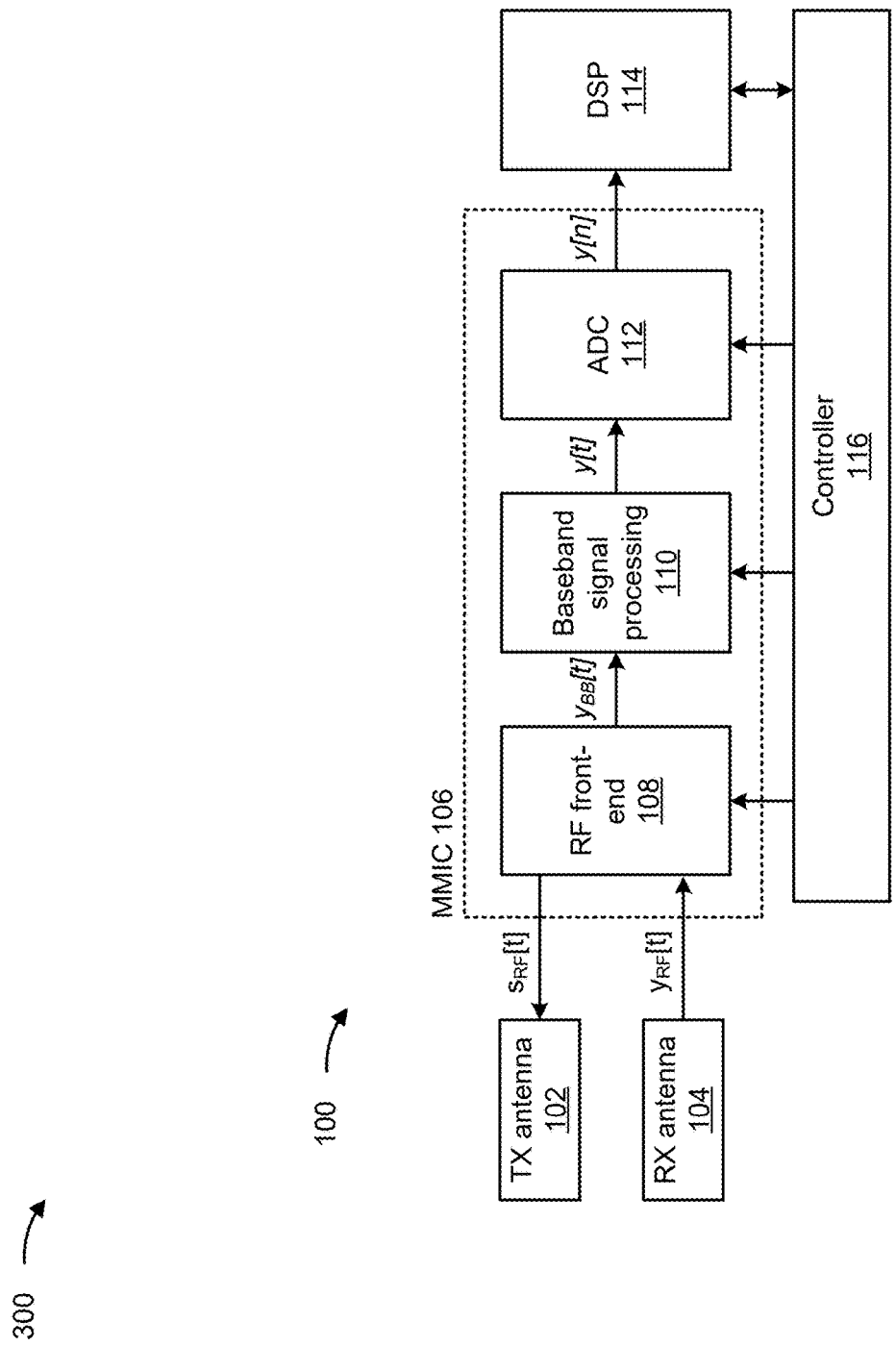
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, a radar MMIC 106 (comprising an RF front-end 108, a baseband signal processing circuit 110, and an analog-to-digital converter (ADC) 112), a digital signal processor (DSP) 114, and a controller 116. In some implementations, the MMIC may include a digital front-end (DFE) coupled downstream from the ADC 112. The digital front-end may include circuit components associated with performing signal processing on a digital signal generated by the ADC 112 (e.g., digital filtering). In some cases, the DFE may include the DSP 114.

In the radar sensor 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an IF band. The RF front-end 108 may be integrated into the radar MMIC 106 with one or more other components, as shown in FIG. 3. The IF band is sometimes also referred to as baseband. Accordingly, "baseband" and "IF band" may be used interchangeably herein. Baseband signals are those signals on the basis of which radar targets are detected.

Antenna arrays may be used instead of single antennas. The depicted example shows a bistatic (or pseudo-monostatic) radar system, which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allows for measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such systems, individual TX channels and RX channels may be constructed identically or similarly and may be distributed over one or more radar MMICs 106.

In some implementations, a signal emitted by the TX antenna 102 may be in a range from approximately 20 GHz to approximately 100 GHz, such as in a range between approximately 76 GHz and approximately 81 GHz. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$. The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller unit (MCU).

In some implementations, the RF front-end 108, the baseband signal processing circuit 110, the ADC 112, and/or the DSP 114 may be integrated in a single radar MMIC 106 (e.g., an RF semiconductor chip). Alternatively, two or more of these components may be distributed over multiple radar MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
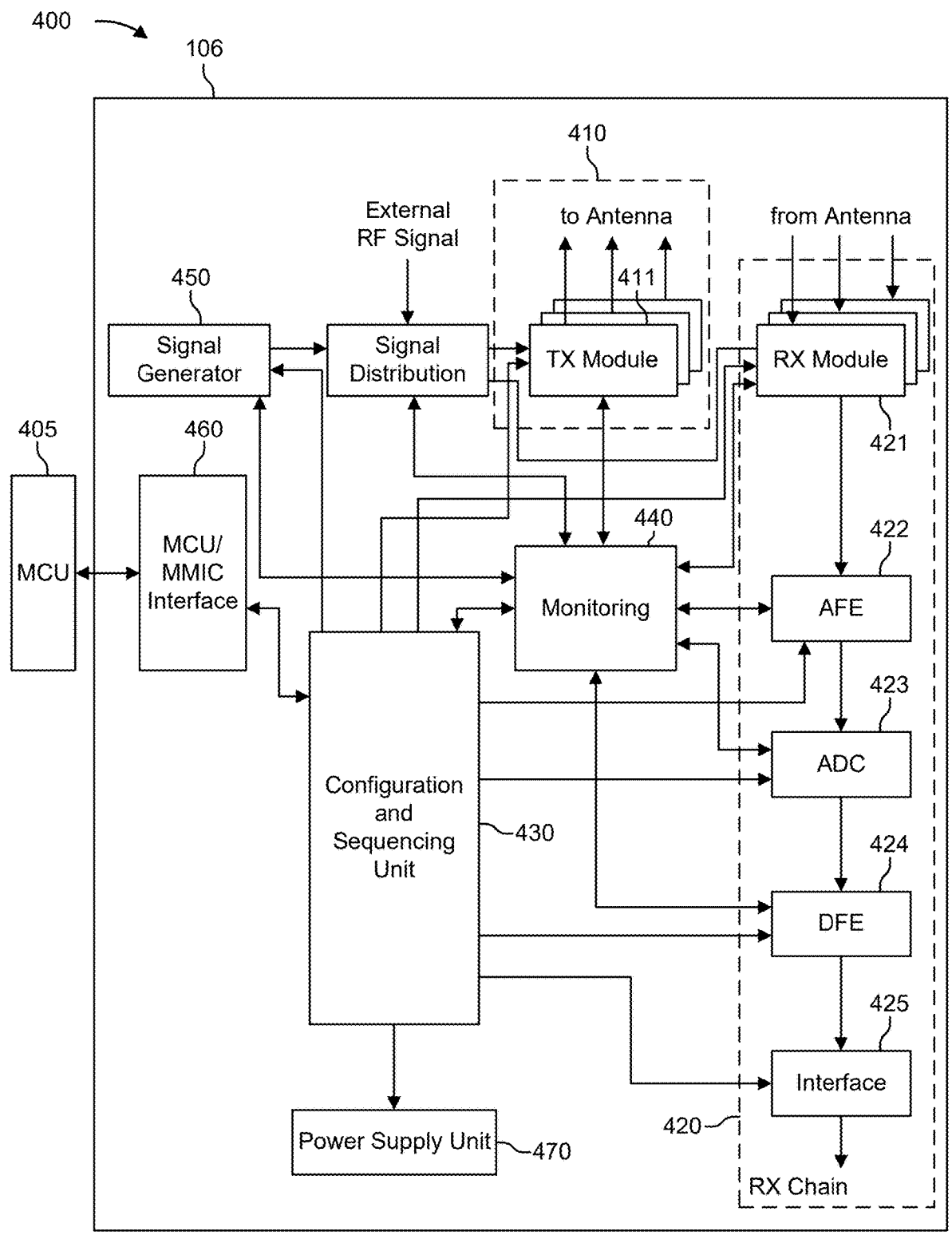
FIG. 4 shows a schematic block diagram of a radar system according to one or more embodiments.

FIG. 4 shows a schematic block diagram of a radar system 400 according to one or more implementations. The radar system 400 includes the radar MMIC 106 (e.g., a semiconductor chip) and an MCU 405. The MCU 405 may correspond to the controller 116 described in connection with FIG. 3. Thus, the MCU 405 may be an external controller. The radar MMIC 106 includes a transmitter 410, including at least one transmit channel 411 for transmitting radar signals, and/or at least one receive channel 420 for receiving and processing radar signals (e.g., radar echoes). The radar MMIC 106 may further include a sequencer 430, a monitoring circuit 440, a ramp signal generator 450, a controller/MMIC interface 460, and a power supply unit 470.

The transmit channel 411 may include one or more circuit components and is configured to generate radar transmission signals and to output the radar transmission signals to one or more antennas. As indicated in FIG. 4, the transmitter 410 can comprise one or more of the transmit channels 411. The receive channel 420 may include one or more circuit components and is configured to receive and process one or more radar reception signals from one or more antennas. As indicated in FIG. 4, the receive channel 420 can comprise one or more receivers 421, an analog front-end 422, an ADC 423, a digital front-end 424, and an interface 425.

The analog front-end 422 may include all of the circuit components needed for RF signal processing. Such circuit components may (but need not necessarily) include, for example, an LO, RF power amplifiers, LNAs, directional couplers such as rat-race-couplers and circulators, and mixers for the down-conversion of RF signals into the baseband or an IF band.

Antenna arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX channels and reception RX channels, which among other things allows for the measurement of the direction (e.g., DOA) from which the radar echoes are received.

In the case of an FMCW radar system, the transmitted RF signals radiated by the TX antenna may be in the range between approximately 20 GHz and 100 GHz (e.g., in the frequency band 21 to 26 GHz or in the frequency band 76 to 81 GHz). As mentioned, the RF signal received by the RX antenna includes the radar echoes (for example, the signal back-scattered at the radar targets).

The received RF signals are down-converted into the baseband (or the IF band) and further processed in the baseband using analog signal processing at the analog front-end 422, which basically includes filtering and amplification of the baseband signal. If the received RF signals are down-converted into the IF band, the baseband signal processing chain of the analog front-end 422 may be referred to as an IF signal processing chain. Thus, the processing chain of the analog front-end 422 may, in general, be referred to as an analog signal processing chain.

The baseband signal is finally digitized using the ADC 423 and further processed in the digital domain at the digital front-end 424. The digital front-end 424 includes a digital signal processing chain implemented, for example, in a DSP.

The sequencer 430 (e.g., a sequencing circuit) may be configured to determine a sequencing scheme for time-dependent functions of the transmitter 410 and/or of the receive channel 420, and also to drive circuit elements of the transmit channel 411 and/or of the receive channel 420 in accordance with the sequencing scheme. A time-dependent function of the transmitter 410 and/or of the receive channel 420 may be a function which is to be performed or carried out in a manner temporally coordinated or synchronized with other time-dependent functions of the transmitter 410 and/or of the receive channel 420 in order to ensure correct operation of the radar sensor or radar system. Accordingly, the sequencing scheme represents a temporally coordinated or synchronized order of performance of individual time-dependent functions.

By way of example, the time-dependent functions may include a function of the transmit channel 411 relating to generating a radio-frequency radar transmission signal (e.g., a frequency-modulated ramp signal), a function of the receive channel 420 relating to processing a radio-frequency radar reception signal, a monitoring function for one or more circuit components of the transmit channel 411 and/or of the receive channel 420, a monitoring function for a signal processed by the transmit channel 411 and/or the receive channel 420, or a calibration of a transmit channel 411 and/or a receive channel 420. For example, the time-dependent function may include a transmit calibration function for calibrating the transmit channel 411, a receive calibration function for calibrating the receive channel 420, a transmit monitoring function for monitoring the transmit channel 411, a receive monitoring function for monitoring the receive channel 420, a ramp function for generating ramp segments of a frequency-modulated ramp signal (e.g., of a radar signal), an event monitoring function for monitoring for a trigger event, a read function to read data from a read memory location of the radar MMIC 106, or a write function to write data to a write memory location of the radar MMIC 106.

The sequencer 430 can be implemented, for example, as a dedicated circuit or as a circuit for executing software (e.g., a sequencing program), and configured to determine the sequencing scheme and to drive circuit elements of the transmitter 410 and/or of the receive channel 420 in accordance with the sequencing program. Thus, the sequencing program may be programmed with the sequencing scheme. In some implementations, the sequencer 430 may be referred to as a digital timing engine, a timing control engine, or a timing controller.

In some implementations, the sequencer 430 may include a decoder and a set of first-in first-out (FIFO) buffers. The decoder may be configured to read the sequencing program (e.g., a specific instruction set including a set of opcodes associated with operating the radar device) from a sequencer memory of the sequencer 430, and generate control values and timestamps based at least in part on the sequencing program. A control value may be a value that is to be provided as an input to a component of the radar MMIC 106 at a time indicated by a corresponding timestamp. The component may be any on-chip component of the radar MMIC 106, including but not limited to the transmit channel 411, the receive channel 420, the monitoring circuit 440, and/or the ramp signal generator 450. The control value (and, optionally, the timestamp) may be stored by a FIFO buffer associated with the component, and the FIFO buffer may be configured to provide the control value as the input to the component of the radar MMIC 106 at the time indicated by the timestamp.

In some implementations, the sequencer 430 may include a processing unit, such as a CPU, configured to read the sequencing program from the sequencer memory and execute the sequencing program. Thus, the sequencer 430 may include a memory (e.g., the sequencer memory) that stores the sequencing program for execution by the dedicated circuit and/or by the processing unit.

Radar operations of the at least one transmit channel 411 and/or of the at least one receive channel 420 are controlled centrally by the sequencer 430. Accordingly, the radar operations can be performed substantially autonomously, including independently of external controllers, on account of the sequencing program executed by the sequencer 430.

Furthermore, a frequency-modulated ramp signal includes a plurality of successive signal sections. Configuration ramp parameters for a ramp command may include frequency parameters for the respective signal section indicating a start frequency $f_{START}$, a stop frequency $f_{STOP}$, a time interval $T_{CHIRP}$, phase parameters indicating a phase setting for the transmit signals, a slope of a frequency ramp, and/or a duration of a pause (e.g., a duration of a wait time interval of a wait ramp segment) between adjacent signal sections. By way of example, a signal section can correspond to a ramp segment of a frequency ramp of the radar signal. Some ramp segments may be frequency ramps with a rising frequency (up-ramp) or a falling frequency (down-ramp). Whether a ramp segment is an up-ramp or a down-ramp may be implied by the start frequency and the stop frequency or may be indicated by a configuration parameter.

The radar MMIC 106 can be used, for example, for a (phase- or frequency-) modulated continuous wave radar system. Accordingly, a transmit channel 411 and/or a receive channel 420 can be part of a modulated continuous wave radar system, for example, of an FMCW radar in the automotive field. The sequencer 430 can accordingly be understood as a central sequencing unit which can coordinate substantial time-critical functions of the automotive FMCW radar front-end, such that a radar operation is an autonomous process which, for example, does not necessitate the participation of an external processor for performing the time-critical functions.

In addition to controlling a desired frequency profile of a radar transmission signal, the sequencer 430 can control various other aspects of a radar sensor or radar system in a synchronized manner.

By way of example, in the transmitter 410, and specifically in a transmit channel 411, a power amplifier can be switched on and off in a synchronized manner, or a phase shift (implemented by a phase shifter) of radar transmission signals can be carried out in a synchronized manner.

The monitoring of a transmit channel 411 and/or of a receive channel 420 can be carried out by a monitoring circuit 440. The latter can accordingly be driven by the sequencer 430 to trigger or to activate or deactivate a channel monitoring function in a synchronized manner in accordance with the sequencing scheme. By way of example, monitoring functions can be activated or deactivated in a synchronized manner during a ramp formation, during a calibration (e.g., amplification of a voltage-controlled oscillator), during a cascaded operation, or during a configuration of external components or slaves (e.g., via an SPI or demultiplexing). The monitoring circuit 440 may monitor the receive channel 420. In some implementations, monitoring the receive channel 420 may include monitoring for and detecting interference (e.g., interfering signals or interference signals), for example, from another radar device. In some implementations, monitoring the receive channel 420 may include providing data to the MCU 405, which may monitor for and detect interference based on the data. In some implementations, the sequencer 430 may receive an indicator from the monitoring circuit 440 or the MCU 405 indicating that interference has been detected.

The ramp signal generator 450 may include a local oscillator, such as a phase-locked loop (PLL), configured to generate signal comprising a plurality of signal sequences based on control values received from the sequencer 430. For example, the local oscillator may generate a frequency-modulated ramp signal based on control values received from the sequencer 430. Thus, the ramp signal generator 450 may be part of a millimeter-wave signal generator that includes the local oscillator and components of a transmit channel 411. The control values may be used to set one or more ramp parameters described herein and implemented by the ramp signal generator 450 to generate the frequency-modulated ramp signal. For example, the ramp parameters implemented by the ramp signal generator 450 may include at least one of a ramp start frequency $f_{START}$ of the frequency-modulated ramp signal, a ramp stop frequency $f_{STOP}$ of the frequency-modulated ramp signal, a ramp frequency difference of the frequency-modulated ramp signal, a ramp time interval of the frequency-modulated ramp signal (e.g., time interval $T_{CHIRP}$), and/or a ramp wait time interval of the frequency-modulated ramp signal.

In the ramp signal generator 450, in a synchronized manner, for example, a bandwidth of the PLL can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set, or a signal source (e.g., when using a plurality of PLLs) can be selected.

In the receiver 421, in a synchronized manner, by way of example, digital or analog filters can be set (resetting, configuration, bypass, etc.) or decimation rates can be set. Low voltage differential signaling (LVDS) modes or calibrations can be chosen in a synchronized manner. Likewise, in a synchronized manner, the receive channel 420 can also be activated or deactivated in its entirety, or a reception frame delay can be set. By way of example, the ADC 423 can also be configured, calibrated, activated, or deactivated in a synchronized manner.

Likewise, general purpose inputs/outputs (GPIOs) can be configured in a synchronized manner, circuit components for generating frequency ramps can be triggered, or diverse circuit components (e.g., ADC 423) can be switched on or off. Moreover, interrupts can be generated or other chip functionality can be triggered.

In order to synchronize the time-dependent functions presented by way of example above, the sequencer 430 can include an instruction-processing unit (not shown) with a specific instruction set for determining the sequencing scheme. The instruction set can describe the configuration flow over time and be, for example, similar to the instruction set of a general-purpose processor. By way of example, the instruction set can include first specific instructions for the configuration of the circuit elements of a transmit channel 411 and/or of a receive channel 420, and second specific instructions for the configuration of frequency parameters of a radio-frequency radar transmission signal generated by the transmit channel 411.

The sequencer 430 can thus be understood as a radar-specific sequencing unit having an instruction set associated with a specific purpose in order to handle time-critical configurations in a highly integrated radar chip.

A controller/MMIC interface 460 shown in FIG. 4 can additionally be used to transmit commands and responses between the MCU 405 and the sequencer 430 via a communication channel or a communication bus, such as an SPI, an LVDS, or another type of communication interface.

A power supply unit 470 supplies power to the chip components and may be configurable by the sequencer 430.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
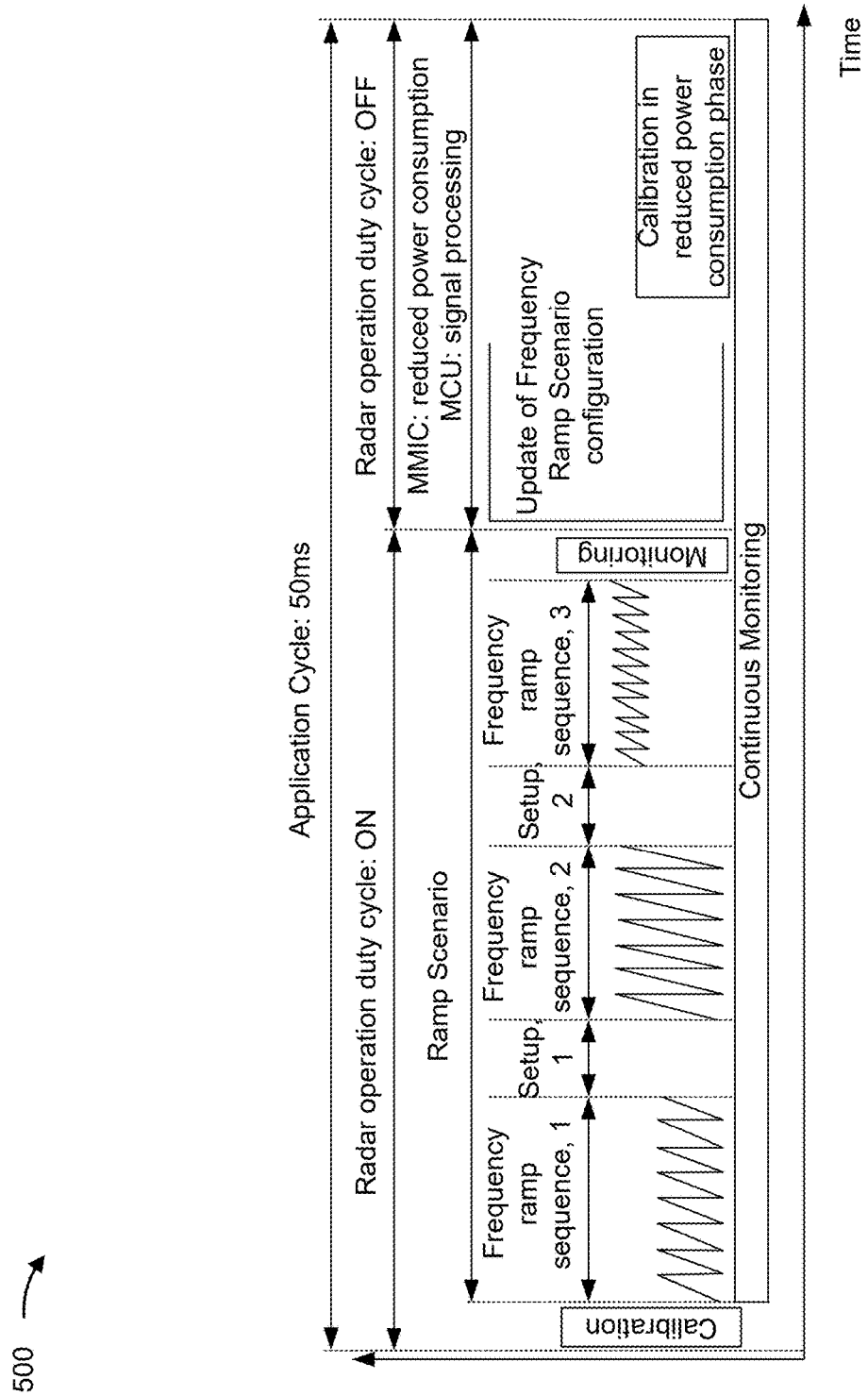
FIG. 5 illustrates an example application cycle according to one or more implementations.

FIG. 5 illustrates an example application cycle 500 according to one or more implementations. The application cycle 500 may include a radar operation duty cycle, including an ON period and an OFF period. During the ON period, the radar MMIC 106 may be configured to perform a warm-up calibration before running a ramp scenario defined by a programming context. In addition, during the ON period, the radar MMIC 106 is configured to perform a ramp scenario during which multiple frequency ramp sequences (e.g., frequency ramp sequence 1, frequency ramp sequence 2, and frequency ramp sequence 3) are transmitted according to ramp parameters defined in associated data of a programming context. In this example, the frequency ramp sequences are generated according to different sets of ramp parameters. Different ramp opcodes in the sequencing program may define the ramp parameters of the frequency ramp sequences. Consecutive frequency ramp sequences may be separated by a long wait ramp segment during which the frequency ramps are not generated (e.g., the frequency of the frequency-modulated ramp signal is held constant). The frequency ramps of each ramp scenario are typically pre-configured with one or more ramp parameters, such as start frequency, stop frequency, bandwidth, power amplifier setting, transmit phase, and duration. For example, each frequency ramp of a ramp scenario may have a same start frequency value, a same stop frequency value, and a same duration value. Different ramp scenarios may be configured with different ramp parameter values.

A setup operation (e.g., setup 1 and setup 2) may be performed by the radar MMIC 106 between frequency ramp sequences (e.g., during the long wait ramp segment). A setup operation may be used to change one or more ramp parameters or may be used to perform a calibration between the frequency ramp sequences.

In addition, during the ON period, the radar MMIC 106 may be configured to perform monitoring for reflected radar signals. During the OFF period, the radar MMIC 106 may continue to monitor for reflected radar signals but may no longer transmit radar signals. As a result, during the OFF period, the radar MMIC 106 may be configured into a reduced power consumption mode. During the OFF period, the MCU 405 may process, via signal processing, the results of the monitoring provided by the radar MMIC 106.

The application cycles may differ in the following ways: by a type of calibration and monitoring that are performed, and which ramp scenario is used. Ramp scenarios include frequency ramp sequences that further include a ramp set (e.g., shown as a triangular waveform). The ramp set may differ in terms of start frequency $f_{START}$, frequency ramp slope, stop frequency $f_{STOP}$, ramp start time $T_{START}$, time interval $T_{CHIRP}$, transmission power, and transmission phase. Additionally, if there are multiple transmit channels, a ramp set may be defined according to which transmit channel is specified for transmitting the ramp set.

As indicated above, FIG. 5 is provided as an example. Other examples may differ from what is described with regard to FIG. 5.

Figure 6:
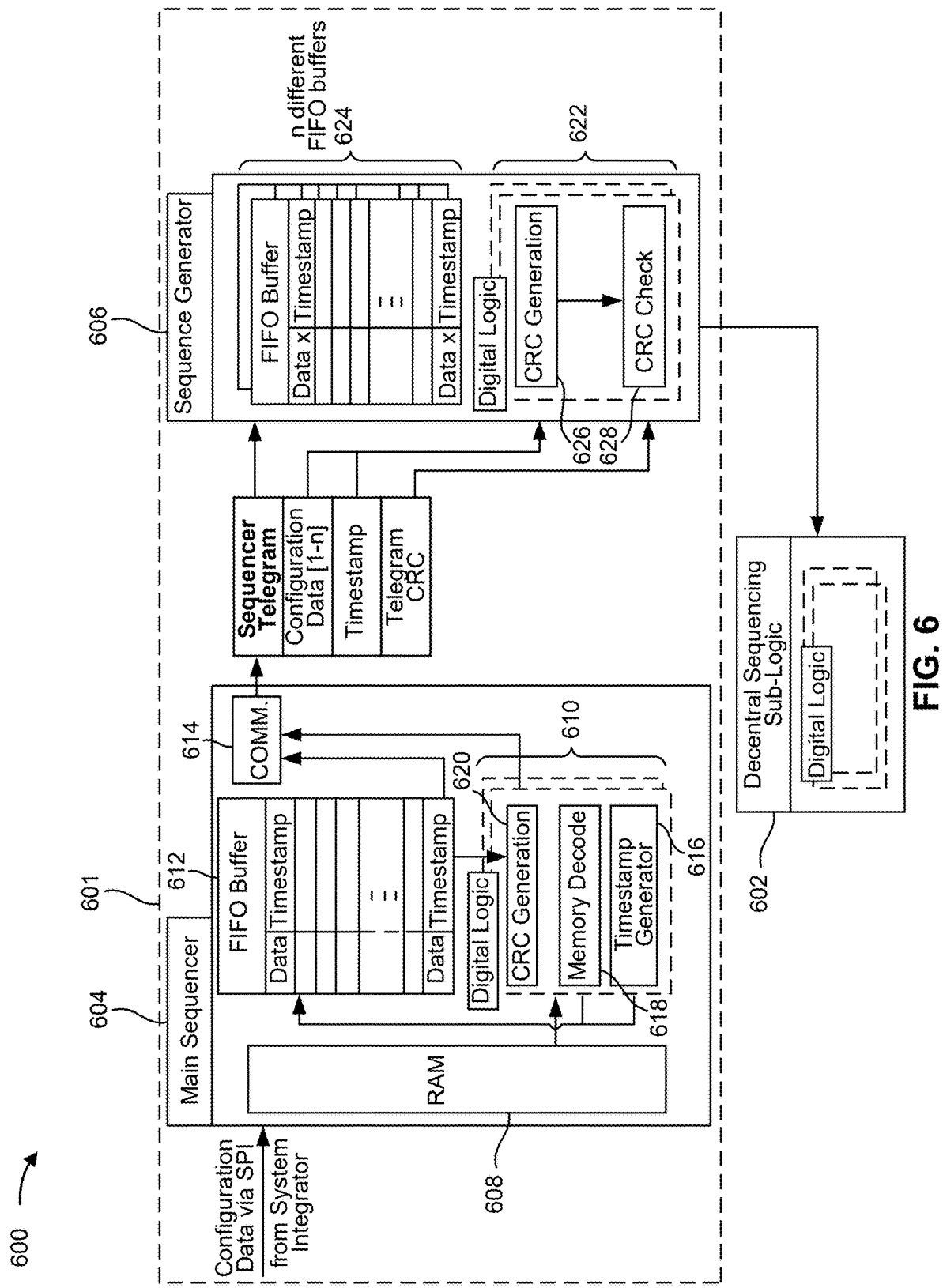
FIG. 6 illustrates an example radar monolithic microwave integrated circuit (MMIC) according to one or more implementations.

FIG. 6 illustrates an example radar MMIC 600 according to one or more implementations. The radar MMIC 600 may include a sequencer 601 and a decentral sequencing sub-logic 602. The sequencer 601 may control to one or more components of the radar MMIC 600 that are provided in the decentral sequencing sub-logic 602. The sequencer 601 may be similar to the sequencer 430 described in connection with FIG. 4. The one or more components may include one or more components of the ramp signal generator 450, such as the local oscillator, one or more components of the transmit channel 411, one or more components of the receive channel 420, and/or any other controllable component of the radar MMIC 106. For example, the radar MMIC 106 may include the decentral sequencing sub-logic 602 that is representative of one or more controllable components. Each controllable component may include digital logic for receiving and processing one or more control signals received from the sequencer 601. In some implementations, each decentral sequencing sub-logic 602 may include redundant logic circuitry that includes redundant logic circuits that may be configured to generate the same outputs that can be checked in a lockstep manner to ensure that the redundant logic circuits are operating correctly.

The sequencer 601 may include a main sequencer 604 (e.g., a central sequencer) and a sequence generator 606 (e.g., a decentral sequence generator). In some implementations, the sequencer 601 may include multiple sequence generators or multiple instances of the sequence generator 606. The main sequencer 604 may control the sequence generator 606 (or each sequence generator) based on configuration data received from a controller, such as MCU 405. For example, the MCU 405 may transmit a sequencing program to the main sequencer 604 by an SPI.

The main sequencer 604 may include a memory 608, digital logic 610 (e.g., one or more logic circuits), one or more FIFO buffers 612, and a communication interface 614. In some implementations, the memory 608 may be provided external to the main sequencer 604. In some implementations, the digital logic 610 may include redundant logic circuitry that includes redundant logic circuits that may be configured to generate the same outputs that can be checked in a lockstep manner to ensure that the redundant logic circuits are operating correctly.

The memory 608 may store the sequencing program associated with controlling one or more controllable components of the decentral sequencing sub-logic 602 in a time-dependent manner (e.g., in a cycle-accurate manner). In some implementations, the memory 608 may be a random-access memory (RAM).

A logic circuit of the digital logic 610 may include a timestamp generator 616, a memory decoder 618, and an error-detecting code generator 620. The digital logic 610 may read the sequencing program from the memory 608. The memory decoder 618 may derive, from the sequencing program, a plurality of instances of configuration data. In addition, the timestamp generator 616 may derive, from the sequencing program, a corresponding timestamp for each instance of configuration data. The timestamp generator 616 may operate in conjunction with the memory decoder 618 to generate the timestamps. Each timestamp may indicate a time at which a respective instance of configuration data associated with the timestamp is to be applied by the sequence generator 606. The memory decoder 618 may derive the plurality of instances of configuration data, sequentially, such that a time corresponding to each subsequent timestamp is later than a time corresponding to a previous timestamp.

Each FIFO buffer 612 may sequentially store the plurality of instances of configuration data and a timestamp for each instance of configuration data. Thus, the timestamp generator 616 and the memory decoder 618 may provide instances of configuration data and corresponding timestamps to a FIFO buffer 612.

The error-detecting code generator 620 may sequentially read out the plurality of instances of configuration data from the FIFO buffer 612 based on a FIFO sequence, and sequentially generate a plurality of first error-detecting codes based on the FIFO sequence. The error-detecting code generator 620 may generate each first error-detecting code based on the at least one instance of configuration data and at least one corresponding timestamp associated with a respective telegram. For example, in some implementations, a telegram may include one instance of configuration data and a corresponding timestamp. Thus, the error-detecting code generator 620 may generate a first error-detecting code based on the instance of configuration data and the corresponding timestamp associated with that telegram. In some implementations, a telegram may include a batch of instances of configuration data (e.g., two or more instances of configuration data) and corresponding timestamps. Thus, the error-detecting code generator 620 may generate a first error-detecting code based on the batch of instances of configuration data and corresponding timestamps associated with that telegram. The first error-detecting codes may be cyclic redundancy checks (CRCs), error correction codes (ECCs), or another type of error-detecting code.

In some implementations, each FIFO buffer 612 may correspond to one controllable component or a particular set of controllable components. Thus, a FIFO buffer 612 may store instances of configuration data for one or more corresponding controllable components.

The communication interface 614 may generate a plurality of telegrams and transmit the plurality of telegrams to the sequence generator 606. Each telegram of the plurality of telegrams may include at least one instance of configuration data, at least one timestamp associated with the at least one instance of configuration data, and the first error-detecting code associated with the telegram. For example, each telegram may include an instance of configuration data, the corresponding timestamp associated with the instance of configuration data, and the first error-detecting code associated with the instance of configuration data. Alternatively, each telegram may include multiple instances of configuration data, multiple timestamps associated with the multiple instances of configuration data, and the first error-detecting code associated with the multiple instances of configuration data and the multiple timestamps to be sent in the telegram.

The sequence generator 606 may receive the plurality of telegrams from the main sequencer 604, generate a second error-detecting code for each telegram, compare the first error-detecting code and the second error-detecting code associated with a same telegram, and trigger a first alarm based on a mismatch between the first error-detecting code and the second error-detecting code. Thus, the sequence generator 606 may include a first error detection mechanism corresponding to the transmission from the main sequencer 604 to the sequence generator 606. Each sequence generator 606 may correspond to one controllable component or a particular set of controllable components.

A sequence generator 606 may include digital logic 622 (e.g., one or more logic circuits) and one or more FIFO buffers 624. A logic circuit of the digital logic 622 may include an error-detecting code generator 626 and an error-detecting code validator 628. In some implementations, the digital logic 622 may include redundant logic circuitry that includes redundant logic circuits that may be configured to generate the same outputs that can be checked in a lockstep manner to ensure that the redundant logic circuits are operating correctly.

As telegrams are received by the sequence generator 606, a FIFO buffer 624 may sequentially store the plurality of instances of configuration data and the timestamps. Thus, the plurality of instances of configuration data and the timestamps received at the sequence generator 606 may be stored in the FIFO buffer 624 according to a FIFO sequence. In some implementations, the first error-detecting codes may also be stored in the FIFO buffer 624 with the plurality of instances of configuration data and the timestamps according to the FIFO sequence, as described in connection with FIG. 7B.

The logic circuit of the digital logic 622 may store the first error-detecting codes received in the telegrams and use the stored first error-detecting codes for comparison with the second error-detecting codes generated by the error-detecting code generator 626. The error-detecting code generator 626 may receive the plurality of instances of configuration data and the timestamps extracted from the telegrams, and generate the plurality of second error-detecting codes based on respective instances of configuration data and timestamps. In other words, as each telegram is received, logic circuit of the digital logic 622 stores the first error-detecting code from the telegram, generates a second error-detecting code based on the data received within the telegram (e.g., an instance of configuration data and the corresponding timestamp), and compares the first error-detecting code with the second error-detecting code.

If the data included in the telegram has not been corrupted, the second error-detecting code should match a corresponding first error-detecting code previously generated by the error-detecting code generator 620. The error-detecting code validator 628 may compare the first error-detecting code and the second error-detecting code associated with the same telegram, and trigger the first alarm based on a mismatch between the first error-detecting code and the second error-detecting code.

The digital logic 622 may generate a control signal for each instance of configuration data, and apply each control signal to a corresponding component of the radar semiconductor chip at a time corresponding to a timestamp associated with the instance of configuration data. For example, a FIFO buffer 624 may sequentially store the plurality of instances of configuration data and the timestamps received from the main sequencer 604. A logic circuit of the digital logic 622 may sequentially read out the plurality of instances of configuration data from the FIFO buffer 624 based on a FIFO sequence, and sequentially generate a plurality of control signals based on the plurality of instances of configuration data and a corresponding timestamp for each instance of configuration data. For example, the logic circuit of the digital logic 622 may generate a control signal with a control value for controlling a ramp parameter of the ramp signal generator 450.

In some implementations, the logic circuit of the digital logic 622 may generate a corresponding control signal associated with the instance of configuration data based on a match between the first error-detecting code and the second error-detecting code. For example, if the first error-detecting code and the second error-detecting code match, the logic circuit of the digital logic 622 may generate the corresponding control signal and transmit the corresponding control signal to the decentral sequencing sub-logic 602. Alternatively, if the first error-detecting code and the second error-detecting code do not match, the logic circuit of the digital logic 622 may interrupt generating the corresponding control signal. In some implementations, the error-detecting code validator 628 may transmit the first alarm to the MCU 405, and the MCU 405 may interrupt the digital logic 622 from generating the corresponding control signal.

As indicated above, FIG. 6 is provided as an example. Other examples may differ from what is described with regard to FIG. 6.

Figure 7A:
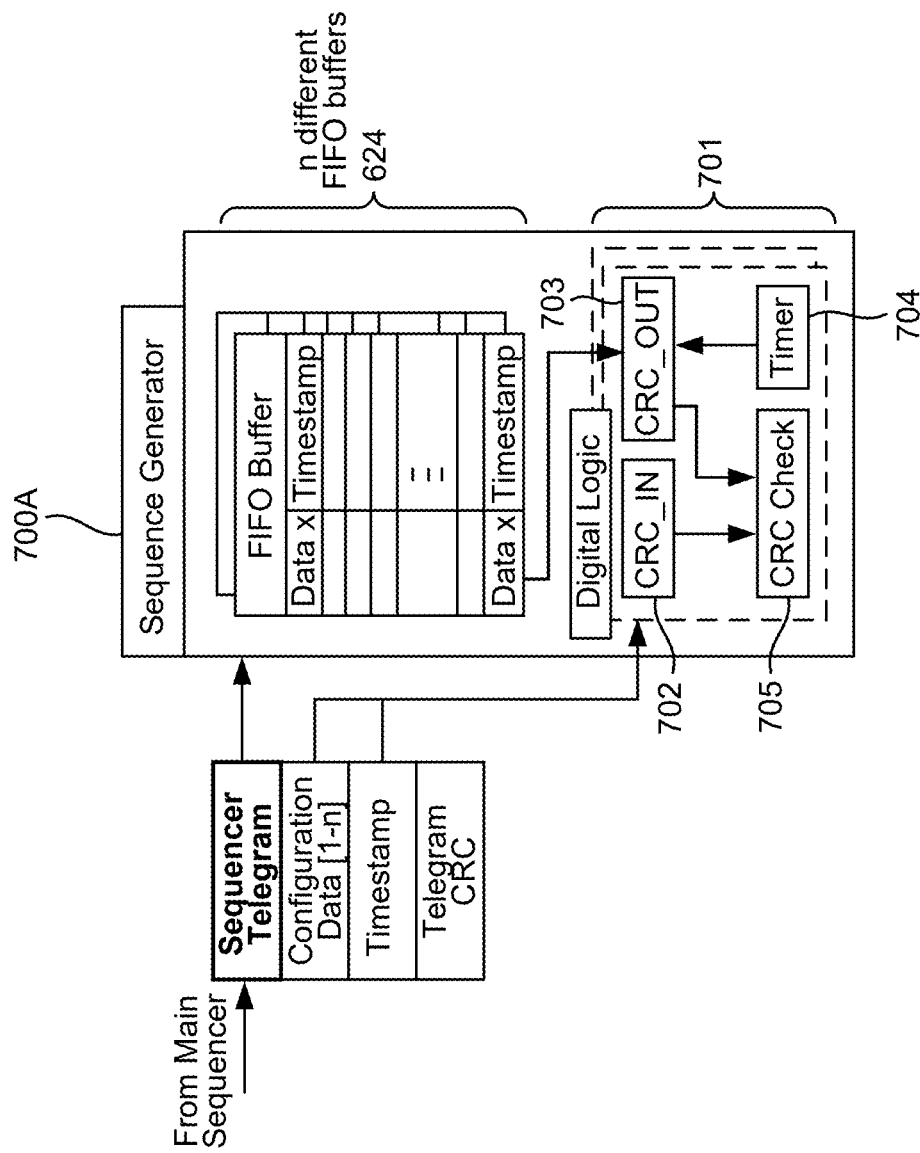
FIG. 7A illustrates an example sequence generator according to one or more implementations.

FIG. 7A illustrates an example sequence generator 700A according to one or more implementations. The sequence generator 700A may include digital logic 701 that may include one or more logic circuits. Each logic circuit of the digital logic 701 may include a first error-detecting code generator 702 for generating first error-detecting codes based on instances of configuration data and timestamps extracted from telegrams received from the main sequencer 604, a second error-detecting code generator 703 for generating second error-detecting codes based on instances of configuration data read out from the FIFO buffer 624, a timer 704 configured to increment or count up a timer value (e.g., a counter value), and an error-detecting code validator 705 for comparing each first error-detecting code with a corresponding second error-detecting code. In some implementations, the digital logic 701 may include redundant logic circuitry that includes redundant logic circuits that may be configured to generate the same outputs that can be checked in a lockstep manner to ensure that the redundant logic circuits are operating correctly.

Thus, the logic circuit of the digital logic 701 includes a second error detection mechanism that is independent of the first error detection mechanism. The second error detection mechanism may correspond to an execution by the sequence generator 700A to control at least one corresponding component based on the timestamp information and the configuration instance transmitted in the transmission. For example, the second error detection mechanism may correspond to protecting an execution of the FIFO buffer 624.

The first error-detecting code generator 702 may generate a first error-detecting code based on data received in a telegram (e.g., an instance of configuration data and the corresponding timestamp). In addition, the second error-detecting code generator 703 may generate a second error-detecting code based on an instance of configuration data read out from the FIFO buffer 624 and a current timer value of the timer 704. The second error-detecting code generator 703 may sequentially read out instances of configuration data from the FIFO buffer 624 based on a FIFO sequence, and sequentially generate a plurality of second error-detecting codes based on the FIFO sequence. The error-detecting code validator 705 may be configured to compare the first error-detecting code and the second error-detecting code corresponding to a same telegram to determine whether the first error-detecting code and the second error-detecting code match. If the data moved through and output from the FIFO buffer 624 has not been corrupted, the second error-detecting code should match the first error-detecting code. The error-detecting code validator 705 may compare the first error-detecting code and the second error-detecting code associated with the same telegram, and trigger a second alarm based on a mismatch between the first error-detecting code and the second error-detecting code. Thus, the logic circuit of the digital logic 701 may detect data corruption in the FIFO buffers 624.

In general, the sequence generator 700A may be configured to receive a plurality of telegrams that provides a plurality of instances of configuration data and corresponding timestamps, wherein each telegram includes an instance of configuration data and a corresponding timestamp associated with the instance of configuration data; generate a plurality of first corresponding error-detecting codes from the plurality of telegrams, including a first corresponding error-detecting code for each instance of configuration data; store the plurality of instances of configuration data and the corresponding timestamps in a FIFO buffer according to a FIFO sequence; generate a plurality of second corresponding error-detecting codes, including a second corresponding error-detecting code for each instance of configuration data read out from the FIFO buffer; compare, based on the FIFO sequence, the first corresponding error-detecting code and the second corresponding error-detecting code associated with a same instance of configuration data; and trigger a second alarm based on a mismatch between the first corresponding error-detecting code and the second corresponding error-detecting code.

As indicated above, FIG. 7A is provided as an example. Other examples may differ from what is described with regard to FIG. 7A.

Figure 7B:
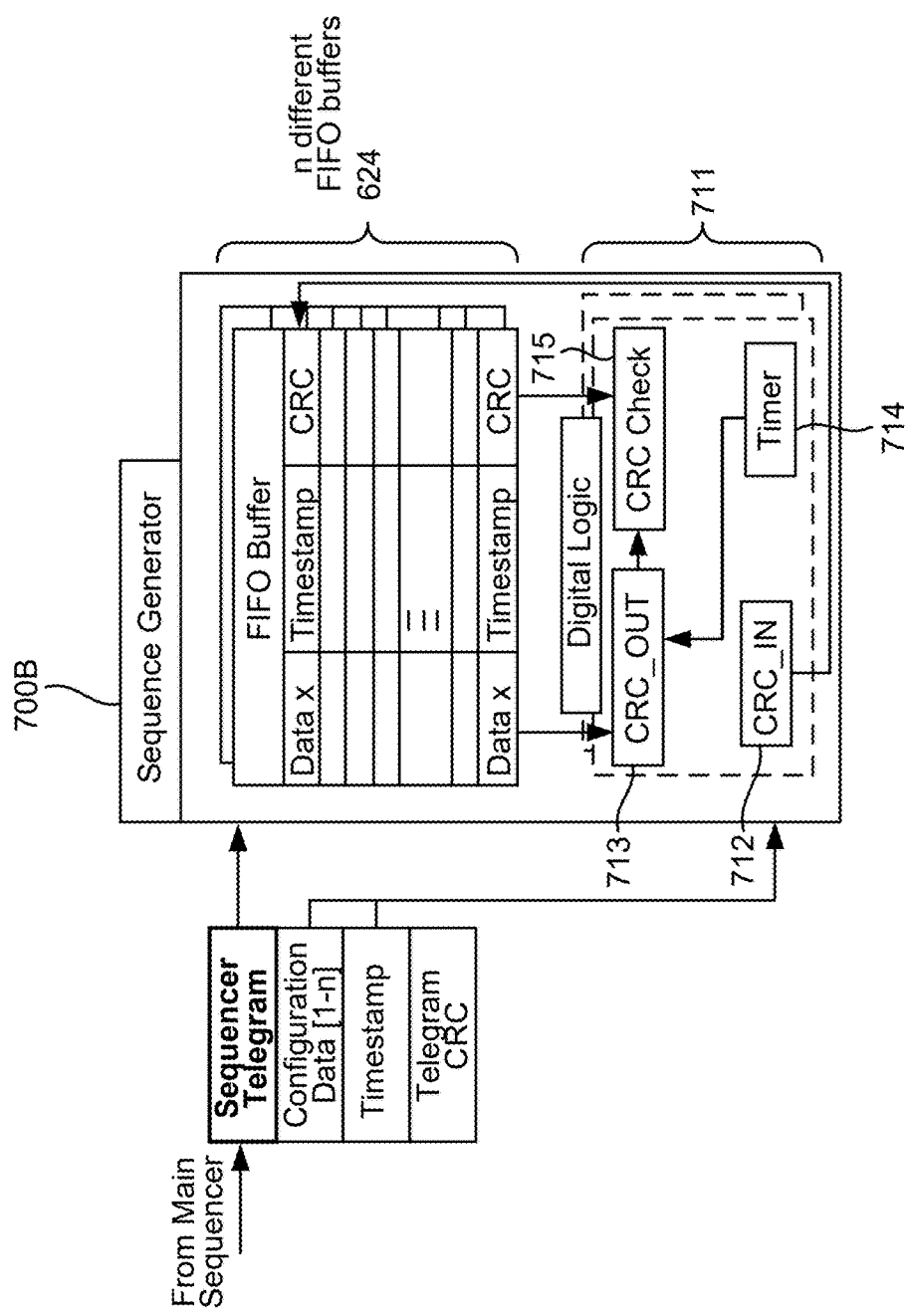
FIG. 7B illustrates an example sequence generator according to one or more implementations.

FIG. 7B illustrates an example sequence generator 700B according to one or more implementations. The sequence generator 700B may include digital logic 711 that may include one or more logic circuits. Each logic circuit of the digital logic 711 may include a first error-detecting code generator 712 for generating first error-detecting codes based on instances of configuration data and timestamps extracted from telegrams received from the main sequencer 604, a second error-detecting code generator 713 for generating second error-detecting codes based on instances of configuration data read out from the FIFO buffer 624, a timer 714 configured to increment or count up a timer value (e.g., a counter value), and an error-detecting code validator 715 for comparing each first error-detecting code with a corresponding second error-detecting code. In some implementations, the digital logic 711 may include redundant logic circuitry that includes redundant logic circuits that may be configured to generate the same outputs that can be checked in a lockstep manner to ensure that the redundant logic circuits are operating correctly.

Thus, the logic circuit of the digital logic 711 includes a second error detection mechanism that is independent of the first error detection mechanism. The second error detection mechanism may correspond to an execution by the sequence generator 700B to control at least one corresponding component based on the timestamp information and the configuration instance transmitted in the transmission. For example, the second error detection mechanism may correspond to protecting an execution of the FIFO buffer 624.

The first error-detecting code generator 712 may generate a first error-detecting code based on data received in a telegram (e.g., an instance of configuration data and the corresponding timestamp), and store each first error-detecting code based in the FIFO buffer 624. In addition, the second error-detecting code generator 713 may generate a second error-detecting code based on instance of configuration data read out from the FIFO buffer 624 and a current timer value of the timer 714. The second error-detecting code generator 713 may sequentially read out instances of configuration data from the FIFO buffer 624 based on a FIFO sequence, and sequentially generate a plurality of second error-detecting codes based on the FIFO sequence. The error-detecting code validator 715 may be configured to compare the first error-detecting code, read out from the FIFO buffer 624, and the second error-detecting code corresponding to a same telegram to determine whether the first error-detecting code and the second error-detecting code match. If the data moved through and output from the FIFO buffer 624 has not been corrupted, the second error-detecting code should match the first error-detecting code. The error-detecting code validator 715 may compare the first error-detecting code and the second error-detecting code associated with the same telegram, and trigger a second alarm based on a mismatch between the first error-detecting code and the second error-detecting code. Thus, the logic circuit of the digital logic 711 may detect data corruption in the FIFO buffers 624.

In general, the sequence generator 700B may be configured to receive a plurality of telegrams that provides a plurality of instances of configuration data and corresponding timestamps, wherein each telegram includes an instance of configuration data and a corresponding timestamp associated with the instance of configuration data; generate a plurality of first corresponding error-detecting codes from the plurality of telegrams, including a first corresponding error-detecting code for each instance of configuration data; store the plurality of instances of configuration data and the corresponding timestamps in a FIFO buffer according to a FIFO sequence; generate a plurality of second corresponding error-detecting codes, including a second corresponding error-detecting code for each instance of configuration data read out from the FIFO buffer; compare, based on the FIFO sequence, the first corresponding error-detecting code and the second corresponding error-detecting code associated with a same instance of configuration data; and trigger a second alarm based on a mismatch between the first corresponding error-detecting code and the second corresponding error-detecting code.

As indicated above, FIG. 7B is provided as an example. Other examples may differ from what is described with regard to FIG. 7B.

Figure 8A:
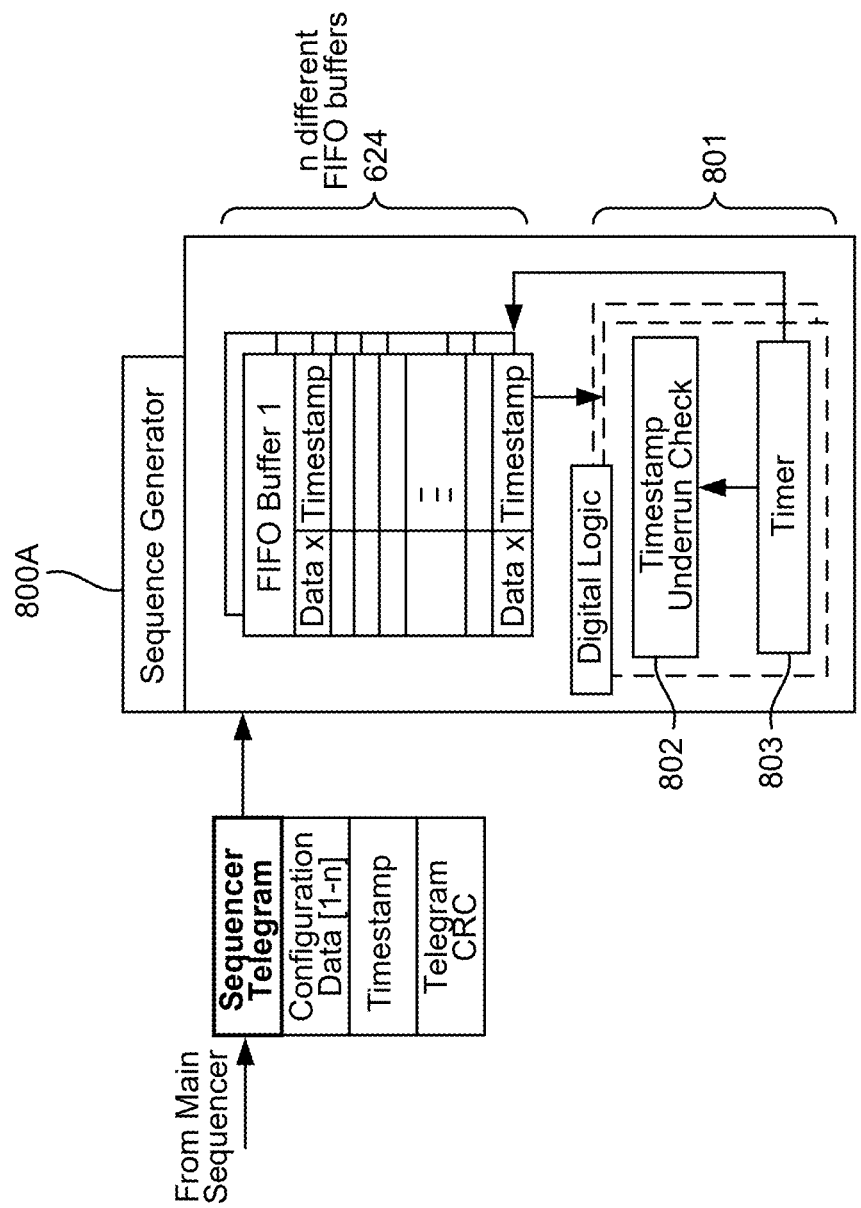
FIG. 8A illustrates an example sequence generator according to one or more implementations.

FIG. 8A illustrates an example sequence generator 800A according to one or more implementations. The sequence generator 800A may be similar to the sequence generator 606, 700A, or 700B, but may include additional digital logic for performing a timestamp-underrun check. The main sequencer (not illustrated) may be decoupled from a cycle-accurate timing requirement. For example, the buffer FIFOs of the main sequencer may create a timing buffer to ensure early delivery of the instances of configuration data and timestamps.

The sequence generator 800A may include digital logic 801 that includes one or more logic circuits. Each logic circuit of the digital logic 801 may include a timestamp validation circuit 802 and a timer 803 that increments a timer value (e.g., a counter value). In some implementations, the digital logic 801 may include redundant logic circuitry that includes redundant logic circuits that may be configured to generate the same outputs that can be checked in a lockstep manner to ensure that the redundant logic circuits are operating correctly.

Upon receiving telegrams at the sequence generator 800A, the FIFO buffer 624 may sequentially store the plurality of instances of configuration data and a corresponding timestamp for each instance of configuration data. The logic circuit of the digital logic 801 may sequentially read out the plurality of instances of configuration data from the FIFO buffer 624 based on a FIFO sequence, and the logic circuit may execute each instance of configuration data at an execution time corresponding to the corresponding timestamp associated with the instance of configuration data. In addition, the timestamp validation circuit 802 may be configured with a valid timing window corresponding to a maximum delay time that extends from the execution time of a most recent instance of configuration data to a threshold time (e.g., to the maximum delay time). The timestamp validation circuit 802 may use the timer value provided by the timer 803 to check a next corresponding timestamp read out from the FIFO buffer 624 with the valid timing window, and trigger a third alarm based on the next corresponding timestamp being outside the valid timing window. In other words, the timestamp validation circuit 802 may check whether the next corresponding timestamp read out from the FIFO buffer 624 exceeds the maximum delay time that extends from the execution time of a most recent instance of configuration data, and trigger the third alarm if the next corresponding timestamp exceeds the maximum delay time.

As indicated above, FIG. 8A is provided as an example. Other examples may differ from what is described with regard to FIG. 8A.

Figure 8B:
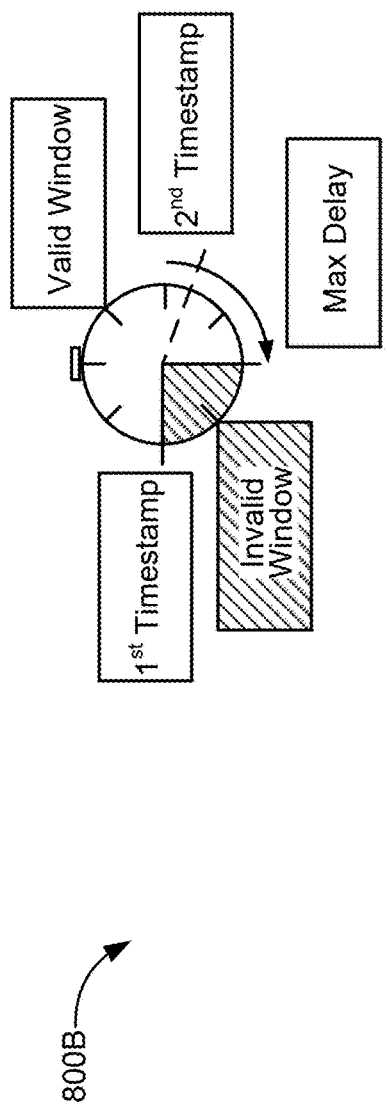
FIG. 8B illustrates an example timing diagram of a timestamp validation check according to one or more implementations.

FIG. 8B illustrates an example timing diagram 800B of a timestamp validation check according to one or more implementations. The logic circuit of the digital logic 801 may readout a first instance of configuration data and a corresponding first timestamp from the FIFO buffer 624, and execute the first instance of configuration data at a time corresponding to the corresponding first timestamp. At this moment, the first instance of configuration data may be referred to as the most recent instance of configuration data. Next, the logic circuit of the digital logic 801 may readout a second instance of configuration data and a corresponding second timestamp from the FIFO buffer 624, and the timestamp validation circuit 802 may perform the timestamp validation check by confirming whether the corresponding second timestamp is within the valid timing window defined by a sum of the execution time of the first instance of configuration data (e.g., a time of the corresponding first timestamp) and the maximum delay time. If the corresponding second timestamp is outside of the valid timing window due to exceeding the maximum delay time, the timestamp validation circuit 802 detects a timestamp-underrun fault and generates the third alarm.

As indicated above, FIG. 8B is provided as an example. Other examples may differ from what is described with regard to FIG. 8B.

Figure 9:
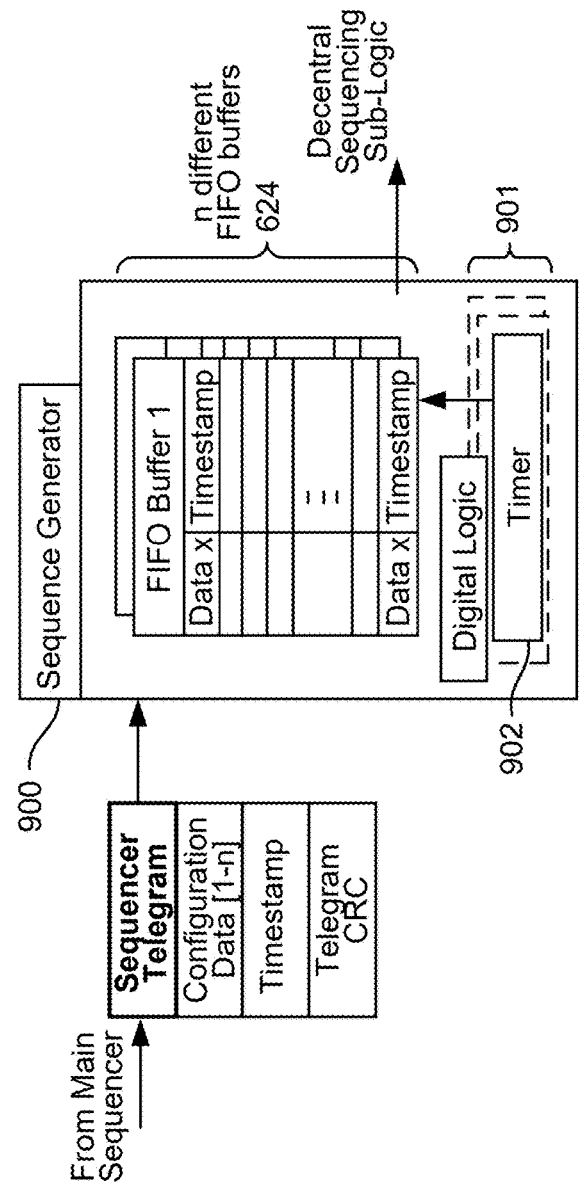
FIG. 9 illustrates an example sequence generator according to one or more implementations.

FIG. 9 illustrates an example sequence generator 900 according to one or more implementations. The sequence generator 900 may be similar to the sequence generator 606, 700A, or 700B, but may include additional digital logic for performing a FIFO empty check at an end of each ramp scenario.

The sequence generator 900 may include digital logic 901 that includes one or more logic circuits. Each logic circuit of the digital logic 901 may include a timer 902 that increments a timer value (e.g., a counter value) that may be used by the logic circuit to trigger a FIFO empty check. In some implementations, the digital logic 901 may include redundant logic circuitry that includes redundant logic circuits that may be configured to generate the same outputs that can be checked in a lockstep manner to ensure that the redundant logic circuits are operating correctly.

At the end of the ramp scenario, all instance of configuration data should have been read out from the FIFO buffer 624 and executed by the logic circuit (e.g., converted into control signals for being applied to a corresponding component). The end of the ramp scenario may correspond to a particular timer value of the timer 902. Thus, the logic circuit may trigger the FIFO empty check when the timer value reaches the particular timer value associated with the end or the ramp scenario. In some implementations, the digital logic 901 may execute, in response to receiving a command from the main sequence 604 at the end of the ramp scenario, a dedicated firmware function to check if each FIFO buffer 624 is empty. The digital logic 901 may determine, based on a completion of the ramp scenario, whether a FIFO buffer 624 is empty, and trigger a fourth alarm based on the FIFO buffer 624 not being empty.

As indicated above, FIG. 9 is provided as an example. Other examples may differ from what is described with regard to FIG. 9.

Figure 10:
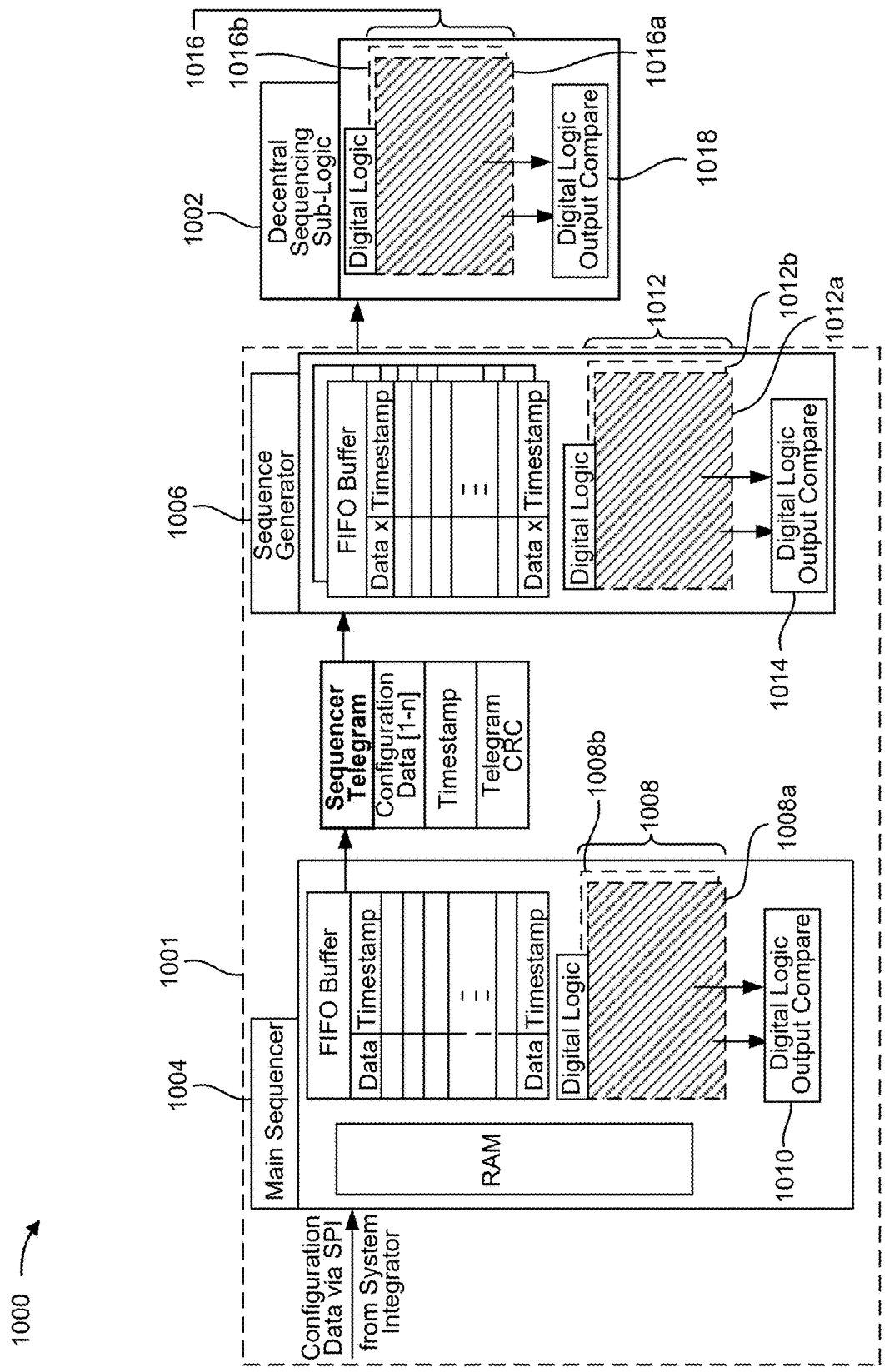
FIG. 10 illustrates a radar MMIC according to one or more implementations.

FIG. 10 illustrates a radar MMIC 1000 according to one or more implementations. The radar MMIC 1000 may be similar to the radar MMIC 600 described in connection with FIG. 6. The radar MMIC 1000 may include a sequencer 1001 and a decentral sequencing sub-logic 1002. The sequencer 1001 may include a main sequencer 1004 (e.g., a central sequencer) and at least one sequence generator 1006 (e.g., at least one decentral sequence generator). The sequence generator 1006 may be similar to sequence generator 606, 700A, 700B, 800A, 900, or any combination thereof.

The main sequencer 1004 may include a first redundant logic circuitry 1008 that includes a first logic circuit 1008a configured to generate a first plurality of outputs based on the sequencing program, and a second logic circuit 1008b configured to operate in lockstep with the first logic circuit 1008a to generate a second plurality of outputs based on the sequencing program. The first logic circuit 1008a and the second logic circuit 1008b may be similar to the logic circuit of the digital logic 610. Thus, the first plurality of outputs and the second plurality of outputs may be instances of configuration data, timestamps, and/or error-detecting codes. If the first logic circuit 1008a and the second logic circuit 1008b are operating correctly, respective first and second outputs should match.

The main sequencer 1004 may also include a lockstep comparison circuit 1010 configured to compare the first plurality of outputs with the second plurality of outputs in a lockstep manner to generate a plurality of comparison results, and trigger a fifth alarm based on a mismatch between the first plurality of outputs and the second plurality of outputs.

The sequence generator 1006 may include second redundant logic circuitry 1012 that includes a first logic circuit 1012a configured to generate a first plurality of outputs based on the plurality of telegrams, and a second logic circuit 1012b configured to operate in lockstep with the first logic circuit 1012a to generate a second plurality of outputs based on the plurality of telegrams. The first logic circuit 1012a and the second logic circuit 1012b may be similar to any of the logic circuits described in connection with FIG. 6, 7A, 7B, 8A, 9, or a combination thereof. Thus, the first plurality of outputs and the second plurality of outputs may be error-detecting codes, timer values, control values, and/or comparison results. If the first logic circuit 1012a and the second logic circuit 1012b are operating correctly, respective first and second outputs should match.

The sequence generator 1006 may also include a lockstep comparison circuit 1014 configured to compare the first plurality of outputs with the second plurality of outputs in a lockstep manner to generate a plurality of comparison results, and trigger a sixth alarm based on a mismatch between the first plurality of outputs and the second plurality of outputs.

The decentral sequencing sub-logic 1002 may include third redundant logic circuitry 1016 that includes a first logic circuit 1016a configured to generate a first plurality of outputs based on one or more control signals, and a second logic circuit 1016b configured to operate in lockstep with the first logic circuit 1016a to generate a second plurality of outputs based on the one or more control signals.

The decentral sequencing sub-logic 1002 may also include a lockstep comparison circuit 1018 configured to compare the first plurality of outputs with the second plurality of outputs in a lockstep manner to generate a plurality of comparison results, and trigger a seventh alarm based on a mismatch between the first plurality of outputs and the second plurality of outputs.

As indicated above, FIG. 10 is provided as an example. Other examples may differ from what is described with regard to FIG. 10.

The following provides an overview of some Aspects of the present disclosure:

Aspect 1: A radar semiconductor chip, comprising: a ramp signal generator configured to generate a frequency-modulated ramp signal comprising a plurality of frequency ramps of a ramp scenario; a memory configured to store a sequencing program associated with controlling one or more components of the radar semiconductor chip in a time-dependent manner; a main sequencer configured to: read the sequencing program from the memory, derive, from the sequencing program, a plurality of instances of configuration data and a corresponding timestamp for each instance of configuration data, generate a plurality of telegrams, wherein each telegram of the plurality of telegrams includes at least one instance of configuration data, at least one timestamp associated with the at least one instance of configuration data, and a first error-detecting code associated with the telegram, and transmit the plurality of telegrams; and at least one sequence generator configured to receive the plurality of telegrams from the main sequencer, generate a second error-detecting code for each telegram, compare the first error-detecting code and the second error-detecting code associated with a same telegram, and trigger a first alarm based on a mismatch between the first error-detecting code and the second error-detecting code.

Aspect 2: The radar semiconductor chip of Aspect 1, wherein the sequence generator is configured to generate a control signal for each instance of configuration data, and apply each control signal to a corresponding component of the radar semiconductor chip at a time corresponding to a timestamp associated with the instance of configuration data.

Aspect 3: The radar semiconductor chip of Aspect 2, wherein the ramp signal generator is configured to generate the plurality of frequency ramps according to a plurality of ramp parameters, and wherein the sequence generator is configured to generate the control signal with a control value for controlling a ramp parameter of the plurality of ramp parameters.

Aspect 4: The radar semiconductor chip of Aspect 2, wherein the sequence generator is configured to generate a corresponding control signal associated with the instance of configuration data based on a match between the first error-detecting code and the second error-detecting code.

Aspect 5: The radar semiconductor chip of any of Aspects 1-4, wherein the main sequencer is configured to generate each first error-detecting code based on the at least one instance of configuration data and at least one corresponding timestamp associated with a respective telegram.

Aspect 6: The radar semiconductor chip of any of Aspects 1-5, wherein each timestamp indicates a time at which a respective instance of configuration data associated with the timestamp is to be applied by the sequence generator.

Aspect 7: The radar semiconductor chip of Aspect 6, wherein the main sequencer is configured to derive the plurality of instances of configuration data, sequentially, such that a time corresponding to each subsequent timestamp is later than a time corresponding to a previous timestamp.

Aspect 8: The radar semiconductor chip of any of Aspects 1-7, wherein the main sequencer comprises: at least one FIFO buffer configured to sequentially store the plurality of instances of configuration data and a timestamp for each instance of configuration data; an error-detecting code generator configured to sequentially read out the plurality of instances of configuration data from the FIFO buffer based on a FIFO sequence, and sequentially generate a plurality of first corresponding error-detecting codes based on the FIFO sequence; and a communication interface configured to generate the plurality of telegrams based on the FIFO sequence.

Aspect 9: The radar semiconductor chip of any of Aspects 1-8, wherein the sequence generator comprises: at least one FIFO buffer configured to sequentially store the plurality of instances of configuration data and the at least one timestamp for each telegram; and a logic circuit configured to sequentially read out the plurality of instances of configuration data from the FIFO buffer based on a FIFO sequence, and sequentially generate a plurality of control signals based on the plurality of instances of configuration data and a corresponding timestamp for each instance of configuration data.

Aspect 10: The radar semiconductor chip of Aspect 9, wherein the sequence generator is further configured to determine, based on a completion of the ramp scenario, whether the FIFO buffer is empty, and trigger a second alarm based on the FIFO buffer not being empty.

Aspect 11: The radar semiconductor chip of any of Aspects 1-10, wherein the main sequencer comprises: redundant logic circuitry including: a first logic circuit configured to generate a first plurality of outputs based on the sequencing program; and a second logic circuit configured to operate in lockstep with the first logic circuit to generate a second plurality of outputs based on the sequencing program; and a lockstep comparison circuit configured to compare the first plurality of outputs with the second plurality of outputs to generate a plurality of comparison results, and trigger a second alarm based on a mismatch between the first plurality of outputs and the second plurality of outputs.

Aspect 12: The radar semiconductor chip of any of Aspects 1-11, wherein the sequence generator comprises: redundant logic circuitry including: a first logic circuit configured to generate a first plurality of outputs based on the plurality of telegrams; and a second logic circuit configured to operate in lockstep with the first logic circuit to generate a second plurality of outputs based on the plurality of telegrams; and a lockstep comparison circuit configured to compare the first plurality of outputs with the second plurality of outputs to generate a plurality of comparison results, and trigger a second alarm based on a mismatch between the first plurality of outputs and the second plurality of outputs.

Aspect 13: The radar semiconductor chip of any of Aspects 1-12, wherein the sequence generator comprises: a FIFO buffer configured to sequentially store the plurality of instances of configuration data and a corresponding timestamp for each instance of configuration data; a logic circuit configured to sequentially read out the plurality of instances of configuration data from the FIFO buffer based on a FIFO sequence, wherein the logic circuit is configured to execute each instance of configuration data at an execution time corresponding to the corresponding timestamp associated with the instance of configuration data; and a timestamp validation circuit configured with a valid timing window corresponding to a maximum delay time that extends from the execution time of a most recent instance of configuration data, wherein the timestamp validation circuit is configured to check a next corresponding timestamp read out from the FIFO buffer with the valid timing window, and trigger a second alarm based on the next corresponding timestamp being outside the valid timing window.

Aspect 14: A radar semiconductor chip, comprising: a ramp signal generator configured to generate a frequency-modulated ramp signal comprising a plurality of frequency ramps of a ramp scenario; and a sequence generator configured to: receive a plurality of telegrams that provides a plurality of instances of configuration data and corresponding timestamps, wherein each telegram includes an instance of configuration data and a corresponding timestamp associated with the instance of configuration data, generate a plurality of first corresponding error-detecting codes from the plurality of telegrams, including a first corresponding error-detecting code for each instance of configuration data, store the plurality of instances of configuration data and the corresponding timestamps in a FIFO buffer according to a FIFO sequence, generate a plurality of second corresponding error-detecting codes, including a second corresponding error-detecting code for each instance of configuration data read out from the FIFO buffer, compare, based on the FIFO sequence, the first corresponding error-detecting code and the second corresponding error-detecting code associated with a same instance of configuration data, and trigger a first alarm based on a mismatch between the first corresponding error-detecting code and the second corresponding error-detecting code.

Aspect 15: The radar semiconductor chip of Aspect 14, further comprising: a memory configured to store a sequencing program associated with controlling one or more components of the radar semiconductor chip in a time-dependent manner; and a main sequencer configured to: read the sequencing program from the memory, derive, from the sequencing program, the plurality of instances of configuration data and the corresponding timestamp for each instance of configuration data, generate the plurality of telegrams, and transmit the plurality of telegrams.

Aspect 16: The radar semiconductor chip of Aspect 15, wherein the main sequencer comprises: redundant logic circuitry including: a first logic circuit configured to generate a first plurality of outputs based on the sequencing program; and a second logic circuit configured to operate in lockstep with the first logic circuit to generate a second plurality of outputs based on the sequencing program; and a lockstep comparison circuit configured to compare the first plurality of outputs with the second plurality of outputs to generate a plurality of comparison results, and trigger a second alarm based on a mismatch between the first plurality of outputs and the second plurality of outputs.

Aspect 17: The radar semiconductor chip of any of Aspects 14-16, wherein the sequence generator is configured to generate a control signal for each instance of configuration data, and apply each control signal to a corresponding component of the radar semiconductor chip at a time corresponding to the corresponding timestamp associated with the instance of configuration data.

Aspect 18: The radar semiconductor chip of Aspect 17, wherein the sequence generator is configured to generate a corresponding control signal associated with the instance of configuration data based on a match between the first corresponding error-detecting code and the second corresponding error-detecting code.

Aspect 19: The radar semiconductor chip of any of Aspects 14-18, wherein the corresponding timestamp indicates a time at which the instance of configuration data associated with the corresponding timestamp is to be applied by the sequence generator.

Aspect 20: The radar semiconductor chip of any of Aspects 14-19, wherein the sequence generator comprises: a timer configured to count up a counter value, wherein the sequence generator is configured to generate each first corresponding error-detecting code based on a first respective data set obtained from a corresponding telegram, the first respective data set including a first respective instance of configuration data and a first corresponding timestamp associated with the first respective instance of configuration data, and wherein the sequence generator is configured to generate each second corresponding error-detecting code based on a second respective data set obtained from a corresponding FIFO output of the FIFO buffer and the timer, the second respective data set including a second respective instance of configuration data and the counter value, the counter value being associated with a time the second respective instance of configuration data is output from the FIFO buffer.

Aspect 21: The radar semiconductor chip of Aspect 20, wherein the sequence generator is further configured to: store each first corresponding error-detecting code in the FIFO buffer according to the FIFO sequence, sequentially read out each first corresponding error-detecting code from the FIFO buffer based on the FIFO sequence, and compare each first corresponding error-detecting code read out from the FIFO buffer with the second corresponding error-detecting code associated with the same instance of configuration data.

Aspect 22: The radar semiconductor chip of any of Aspects 14-21, wherein the sequence generator is further configured to determine, based on a completion of the ramp scenario, whether the FIFO buffer is empty, and trigger a second alarm based on the FIFO buffer not being empty.

Aspect 23: The radar semiconductor chip of any of Aspects 14-22, wherein the sequence generator comprises: redundant logic circuitry including: a first logic circuit configured to generate a first plurality of outputs based on the plurality of telegrams; and a second logic circuit configured to operate in lockstep with the first logic circuit to generate a second plurality of outputs based on the plurality of telegrams; and a lockstep comparison circuit configured to compare the first plurality of outputs with the second plurality of outputs to generate a plurality of comparison results, and trigger a second alarm based on a mismatch between the first plurality of outputs and the second plurality of outputs.

Aspect 24: The radar semiconductor chip of any of Aspects 14-23, wherein the sequence generator comprises: a logic circuit configured to sequentially read out the plurality of instances of configuration data from the FIFO buffer based on the FIFO sequence, wherein the logic circuit is configured to execute each instance of configuration data at an execution time corresponding to the corresponding timestamp associated with the instance of configuration data; and a timestamp validation circuit configured with a valid timing window corresponding to a maximum delay time that extends from the execution time of a most recent instance of configuration data, wherein the timestamp validation circuit is configured to check a next corresponding timestamp read out from the FIFO buffer with the valid timing window, and trigger a second alarm based on the next corresponding timestamp being outside the valid timing window.

Aspect 25: A monolithic microwave integrated circuit (MMIC) semiconductor chip, comprising: a millimeter-wave signal generator configured to generate a signal comprising a plurality of signal sequences; a central sequencer configured to control at least one decentral sequence generator based on a timestamp information and a configuration instance transmitted in a transmission from the central sequencer to the decentral sequence generator to control at least one corresponding component in a cycle-accurate manner; a first error detection mechanism corresponding to the transmission from the central sequencer to the at least one decentral sequence generator; and a second error detection mechanism that is independent of the first error detection mechanism, the second error detection mechanism corresponding to an execution by the decentral sequence generator to control the at least one corresponding component based on the timestamp information and the configuration instance transmitted in the transmission.

Aspect 26: A radar semiconductor chip, comprising: a ramp signal generator configured to generate a frequency-modulated ramp signal comprising a plurality of frequency ramps of a ramp scenario; a memory configured to store a sequencing program associated with controlling one or more components of the radar semiconductor chip in a time-dependent manner; a main sequencer configured to: read the sequencing program from the memory, derive, from the sequencing program, a plurality of instances of configuration data and a corresponding timestamp for each instance of configuration data, generate a plurality of first corresponding error-detecting codes, including a first corresponding error-detecting code for each instance of configuration data, generate a plurality of telegrams, including a telegram for each instance of configuration data, wherein each telegram includes an instance of configuration data, the corresponding timestamp associated with the instance of configuration data, and the first corresponding error-detecting code associated with the instance of configuration data, and transmit the plurality of telegrams; and a sequence generator configured to receive the plurality of telegrams from the main sequencer, generate a second corresponding error-detecting code for each telegram, compare the first corresponding error-detecting code and the second corresponding error-detecting code associated with a same telegram, and trigger a first alarm based on a mismatch between the first corresponding error-detecting code and the second corresponding error-detecting code.

Aspect 27: A system configured to perform one or more operations recited in one or more of Aspects 1-26.

Aspect 28: An apparatus comprising means for performing one or more operations recited in one or more of Aspects 1-26.

Aspect 29: A non-transitory computer-readable medium storing a set of instructions, the set of instructions comprising one or more instructions that, when executed by a device, cause the device to perform one or more operations recited in one or more of Aspects 1-26.

Aspect 30: A computer program product comprising instructions or code for executing one or more operations recited in one or more of Aspects 1-26.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable gate arrays (FPGAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A radar semiconductor chip, comprising:
   a ramp signal generator configured to generate a frequency-modulated ramp signal comprising a plurality of frequency ramps of a ramp scenario;
   a memory configured to store a sequencing program associated with controlling one or more components of the radar semiconductor chip in a time-dependent manner;
   a main sequencer configured to:
      read the sequencing program from the memory,
      derive, from the sequencing program, a plurality of instances of configuration data and a corresponding timestamp for each instance of configuration data,
      generate a plurality of telegrams, wherein each telegram of the plurality of telegrams includes at least one instance of configuration data, at least one timestamp associated with the at least one instance of configuration data, and a first error-detecting code associated with the telegram, and
      transmit the plurality of telegrams; and
   at least one sequence generator configured to receive the plurality of telegrams from the main sequencer, generate a second error-detecting code for each telegram, compare the first error-detecting code and the second error-detecting code associated with a same telegram, and trigger a first alarm based on a mismatch between the first error-detecting code and the second error-detecting code.

2. The radar semiconductor chip of claim 1, wherein the sequence generator is configured to generate a control signal for each instance of configuration data, and apply each control signal to a corresponding component of the radar semiconductor chip at a time corresponding to a timestamp associated with the instance of configuration data.

3. The radar semiconductor chip of claim 2, wherein the ramp signal generator is configured to generate the plurality of frequency ramps according to a plurality of ramp parameters, and
   wherein the sequence generator is configured to generate the control signal with a control value for controlling a ramp parameter of the plurality of ramp parameters.

4. The radar semiconductor chip of claim 2, wherein the sequence generator is configured to generate a corresponding control signal associated with the instance of configuration data based on a match between the first error-detecting code and the second error-detecting code.

5. The radar semiconductor chip of claim 1, wherein the main sequencer is configured to generate each first error-detecting code based on the at least one instance of configuration data and at least one corresponding timestamp associated with a respective telegram.

6. The radar semiconductor chip of claim 1, wherein each timestamp indicates a time at which a respective instance of configuration data associated with the timestamp is to be applied by the sequence generator.

7. The radar semiconductor chip of claim 6, wherein the main sequencer is configured to derive the plurality of instances of configuration data, sequentially, such that a time corresponding to each subsequent timestamp is later than a time corresponding to a previous timestamp.

8. The radar semiconductor chip of claim 1, wherein the main sequencer comprises:
   at least one first in, first out (FIFO) buffer configured to sequentially store the plurality of instances of configuration data and a timestamp for each instance of configuration data;
   an error-detecting code generator configured to sequentially read out the plurality of instances of configuration data from the FIFO buffer based on a FIFO sequence, and sequentially generate a plurality of first corresponding error-detecting codes based on the FIFO sequence; and
   a communication interface configured to generate the plurality of telegrams based on the FIFO sequence.

9. The radar semiconductor chip of claim 1, wherein the sequence generator comprises:
   at least one first in, first out (FIFO) buffer configured to sequentially store the plurality of instances of configuration data and the at least one timestamp for each telegram; and
   a logic circuit configured to sequentially read out the plurality of instances of configuration data from the FIFO buffer based on a FIFO sequence, and sequentially generate a plurality of control signals based on the plurality of instances of configuration data and a corresponding timestamp for each instance of configuration data.

10. The radar semiconductor chip of claim 9, wherein the sequence generator is further configured to determine, based on a completion of the ramp scenario, whether the FIFO buffer is empty, and trigger a second alarm based on the FIFO buffer not being empty.

11. The radar semiconductor chip of claim 1, wherein the main sequencer comprises:
    redundant logic circuitry including:
       a first logic circuit configured to generate a first plurality of outputs based on the sequencing program; and
       a second logic circuit configured to operate in lockstep with the first logic circuit to generate a second plurality of outputs based on the sequencing program; and
    a lockstep comparison circuit configured to compare the first plurality of outputs with the second plurality of outputs to generate a plurality of comparison results, and trigger a second alarm based on a mismatch between the first plurality of outputs and the second plurality of outputs.

12. The radar semiconductor chip of claim 1, wherein the sequence generator comprises:
    redundant logic circuitry including:
       a first logic circuit configured to generate a first plurality of outputs based on the plurality of telegrams; and
       a second logic circuit configured to operate in lockstep with the first logic circuit to generate a second plurality of outputs based on the plurality of telegrams; and a lockstep comparison circuit configured to compare the first plurality of outputs with the second plurality of outputs to generate a plurality of comparison results, and trigger a second alarm based on a mismatch between the first plurality of outputs and the second plurality of outputs.

13. The radar semiconductor chip of claim 1, wherein the sequence generator comprises:
a first in, first out (FIFO) buffer configured to sequentially store the plurality of instances of configuration data and a corresponding timestamp for each instance of configuration data;
a logic circuit configured to sequentially read out the plurality of instances of configuration data from the FIFO buffer based on a FIFO sequence, wherein the logic circuit is configured to execute each instance of configuration data at an execution time corresponding to the corresponding timestamp associated with the instance of configuration data; and
a timestamp validation circuit configured with a valid timing window corresponding to a maximum delay time that extends from the execution time of a most recent instance of configuration data,
wherein the timestamp validation circuit is configured to check a next corresponding timestamp read out from the FIFO buffer with the valid timing window, and trigger a second alarm based on the next corresponding timestamp being outside the valid timing window.

14. A radar semiconductor chip, comprising:
a ramp signal generator configured to generate a frequency-modulated ramp signal comprising a plurality of frequency ramps of a ramp scenario; and
a sequence generator configured to:
receive a plurality of telegrams that provides a plurality of instances of configuration data and corresponding timestamps, wherein each telegram includes an instance of configuration data and a corresponding timestamp associated with the instance of configuration data,
generate a plurality of first corresponding error-detecting codes from the plurality of telegrams, including a first corresponding error-detecting code for each instance of configuration data,
store the plurality of instances of configuration data and the corresponding timestamps in a first in, first out (FIFO) buffer according to a FIFO sequence,
generate a plurality of second corresponding error-detecting codes, including a second corresponding error-detecting code for each instance of configuration data read out from the FIFO buffer,
compare, based on the FIFO sequence, the first corresponding error-detecting code and the second corresponding error-detecting code associated with a same instance of configuration data, and
trigger a first alarm based on a mismatch between the first corresponding error-detecting code and the second corresponding error-detecting code.

15. The radar semiconductor chip of claim 14, further comprising:
a memory configured to store a sequencing program associated with controlling one or more components of the radar semiconductor chip in a time-dependent manner; and
a main sequencer configured to:
read the sequencing program from the memory,
derive, from the sequencing program, the plurality of instances of configuration data and the corresponding timestamp for each instance of configuration data,
generate the plurality of telegrams, and
transmit the plurality of telegrams.

16. The radar semiconductor chip of claim 15, wherein the main sequencer comprises:
redundant logic circuitry including:
a first logic circuit configured to generate a first plurality of outputs based on the sequencing program; and
a second logic circuit configured to operate in lockstep with the first logic circuit to generate a second plurality of outputs based on the sequencing program; and
a lockstep comparison circuit configured to compare the first plurality of outputs with the second plurality of outputs to generate a plurality of comparison results, and trigger a second alarm based on a mismatch between the first plurality of outputs and the second plurality of outputs.

17. The radar semiconductor chip of claim 14, wherein the sequence generator is configured to generate a control signal for each instance of configuration data, and apply each control signal to a corresponding component of the radar semiconductor chip at a time corresponding to the corresponding timestamp associated with the instance of configuration data.

18. The radar semiconductor chip of claim 17, wherein the sequence generator is configured to generate a corresponding control signal associated with the instance of configuration data based on a match between the first corresponding error-detecting code and the second corresponding error-detecting code.

19. The radar semiconductor chip of claim 14, wherein the corresponding timestamp indicates a time at which the instance of configuration data associated with the corresponding timestamp is to be applied by the sequence generator.

20. The radar semiconductor chip of claim 14, wherein the sequence generator comprises:
a timer configured to count up a counter value,
wherein the sequence generator is configured to generate each first corresponding error-detecting code based on a first respective data set obtained from a corresponding telegram, the first respective data set including a first respective instance of configuration data and a first corresponding timestamp associated with the first respective instance of configuration data, and
wherein the sequence generator is configured to generate each second corresponding error-detecting code based on a second respective data set obtained from a corresponding FIFO output of the FIFO buffer and the timer, the second respective data set including a second respective instance of configuration data and the counter value, the counter value being associated with a time the second respective instance of configuration data is output from the FIFO buffer.

21. The radar semiconductor chip of claim 20, wherein the sequence generator is further configured to:
store each first corresponding error-detecting code in the FIFO buffer according to the FIFO sequence,
sequentially read out each first corresponding error-detecting code from the FIFO buffer based on the FIFO sequence, and compare each first corresponding error-detecting code read out from the FIFO buffer with the second corresponding error-detecting code associated with the same instance of configuration data.

22. The radar semiconductor chip of claim 14, wherein the sequence generator is further configured to determine, based on a completion of the ramp scenario, whether the FIFO buffer is empty, and trigger a second alarm based on the FIFO buffer not being empty.

23. The radar semiconductor chip of claim 14, wherein the sequence generator comprises:
   redundant logic circuitry including:
      a first logic circuit configured to generate a first plurality of outputs based on the plurality of telegrams; and
      a second logic circuit configured to operate in lockstep with the first logic circuit to generate a second plurality of outputs based on the plurality of telegrams; and
   a lockstep comparison circuit configured to compare the first plurality of outputs with the second plurality of outputs to generate a plurality of comparison results, and trigger a second alarm based on a mismatch between the first plurality of outputs and the second plurality of outputs.

24. The radar semiconductor chip of claim 14, wherein the sequence generator comprises:
   a logic circuit configured to sequentially read out the plurality of instances of configuration data from the FIFO buffer based on the FIFO sequence, wherein the logic circuit is configured to execute each instance of configuration data at an execution time corresponding to the corresponding timestamp associated with the instance of configuration data; and
   a timestamp validation circuit configured with a valid timing window corresponding to a maximum delay time that extends from the execution time of a most recent instance of configuration data,
   wherein the timestamp validation circuit is configured to check a next corresponding timestamp read out from the FIFO buffer with the valid timing window, and trigger a second alarm based on the next corresponding timestamp being outside the valid timing window.

25. A monolithic microwave integrated circuit (MMIC) semiconductor chip, comprising:
   a millimeter-wave signal generator configured to generate a signal comprising a plurality of signal sequences;
   a central sequencer configured to control at least one decentral sequence generator based on a timestamp information and a configuration instance transmitted in a transmission from the central sequencer to the decentral sequence generator to control at least one corresponding component in a cycle-accurate manner;
   a first error detection mechanism corresponding to the transmission from the central sequencer to the at least one decentral sequence generator; and
   a second error detection mechanism that is independent of the first error detection mechanism, the second error detection mechanism corresponding to an execution by the decentral sequence generator to control the at least one corresponding component based on the timestamp information and the configuration instance transmitted in the transmission.

* * * * *